United States Patent
Liu

(10) Patent No.: US 9,623,888 B2
(45) Date of Patent: *Apr. 18, 2017

(54) FOLDABLE WALKER APPARATUS

(71) Applicant: Evolution Technologies Inc., Port Coquitlam (CA)

(72) Inventor: Julian Liu, Port Moody, CA (US)

(73) Assignee: EVOLUTION TECHNOLOGIES INC., Port Coquitlam (CA)

(*) Notice: Subject to any disclaimer, the term of this patent is extended or adjusted under 35 U.S.C. 154(b) by 361 days.

This patent is subject to a terminal disclaimer.

(21) Appl. No.: 14/300,040

(22) Filed: Jun. 9, 2014

(65) Prior Publication Data

US 2014/0284891 A1    Sep. 25, 2014

Related U.S. Application Data

(60) Continuation of application No. 13/115,551, filed on May 25, 2011, and a division of application No. (Continued)

(51) Int. Cl.
  *A61H 3/04*     (2006.01)
  *B62B 3/02*     (2006.01)
  (Continued)

(52) U.S. Cl.
  CPC ............ *B62B 3/02* (2013.01); *A61H 3/04* (2013.01); *B62B 5/04* (2013.01);
  (Continued)

(58) Field of Classification Search
  None
  See application file for complete search history.

(56) References Cited

U.S. PATENT DOCUMENTS 522,117 A    6/1894    Humphrey
534,443 A    2/1895    Manguine
(Continued)

FOREIGN PATENT DOCUMENTS

AT    214095    3/1961
AT    242315    9/1965
(Continued)

OTHER PUBLICATIONS

International Search Report and Written Opinion for PCT/CA2016/050371 dated Jun. 9, 2016.
(Continued)

*Primary Examiner* — John Walters
*Assistant Examiner* — Hilary L Johns
(74) *Attorney, Agent, or Firm* — Symbus Law Group, LLC; Clifford D. Hyra

(57) ABSTRACT

The present invention provides a folding mechanism for a walker apparatus. The folding mechanism includes a pair of spaced-apart inner frame members. Each of the inner frame members has a first part and a second part hingedly connected together. The folding mechanism includes a pair of link members diagonally extending between and pivotally connecting to the inner frame members. The link members operatively connect the inner frame members together. According to another aspect, there is provided a walker apparatus having a pair of spaced-apart, foldable inner frame members and a pair of diagonally-extending link members. The link members connect the inner frame members together.

20 Claims, 24 Drawing Sheets

Related U.S. Application Data

12/247,781, filed on Oct. 8, 2008, now Pat. No. 8,083,239.

(51) Int. Cl.
*B62B 5/04* (2006.01)
*A61H 3/00* (2006.01)

(52) U.S. Cl.
CPC .. *A61H 2003/002* (2013.01); *A61H 2003/046* (2013.01); *A61H 2201/0161* (2013.01); *A61H 2201/0192* (2013.01); *A61H 2201/1633* (2013.01)

(56) References Cited

U.S. PATENT DOCUMENTS

| | | |
|---|---|---|
| 879,803 A | 2/1908 | Vlasak |
| 1,767,925 A | 6/1930 | Hargreaves |
| 2,169,860 A | 8/1939 | Von Hoom |
| 2,483,307 A | 9/1949 | Wheary, Jr. |
| 2,681,809 A | 6/1954 | Hamill |
| 2,732,047 A | 1/1956 | Finkelstein |
| 2,812,227 A | 5/1957 | Hill |
| 2,937,248 A | 5/1960 | Michetti |
| 2,987,149 A | 6/1961 | Finkelstein |
| 3,109,899 A | 11/1963 | Pastene |
| 3,142,351 A | 7/1964 | Green |
| 3,376,400 A | 4/1968 | Batt et al. |
| 3,409,105 A | 11/1968 | Clinton |
| 3,690,652 A | 9/1972 | Schneider |
| 3,692,155 A | 9/1972 | Laurita |
| 3,890,668 A | 6/1975 | Stosberg et al. |
| 3,927,727 A | 12/1975 | Hanagan |
| 4,029,279 A | 6/1977 | Nakatani |
| 4,056,115 A | 11/1977 | Thomas |
| 4,087,141 A | 5/1978 | Roberts |
| 4,116,464 A | 9/1978 | Haley |
| 4,149,721 A | 4/1979 | Strickland |
| 4,185,936 A | 1/1980 | Takahashi |
| 4,286,401 A | 9/1981 | Pachmayr et al. |
| 4,325,561 A | 4/1982 | Lynn |
| 4,371,183 A | 2/1983 | Dion |
| 4,460,188 A | 7/1984 | Maloof |
| 4,477,098 A | 10/1984 | Minnebraker |
| 4,570,370 A | 2/1986 | Smith et al. |
| 4,596,484 A | 6/1986 | Nakatani |
| 4,722,114 A | 2/1988 | Neumann |
| 4,761,092 A | 8/1988 | Nakatani |
| 4,830,035 A | 5/1989 | Liu |
| 4,856,123 A | 8/1989 | Henderson et al. |
| 4,883,317 A | 11/1989 | Davenport |
| 4,890,355 A | 1/1990 | Schulten |
| 4,930,697 A | 6/1990 | Takahashi et al. |
| 4,962,781 A | 10/1990 | Kanbar |
| 5,020,560 A | 6/1991 | Turbeville |
| 5,052,075 A | 10/1991 | Harris |
| 5,167,048 A | 12/1992 | Geiger et al. |
| 5,188,139 A | 2/1993 | Garelick |
| 5,269,157 A | 12/1993 | Ciminelli et al. |
| 5,380,034 A | 1/1995 | Wilson |
| 5,429,377 A | 7/1995 | Duer |
| 5,433,235 A | 7/1995 | Miric et al. |
| 5,465,745 A | 11/1995 | Davis |
| 5,475,896 A | 12/1995 | Wang |
| 5,499,697 A | 3/1996 | Trimble et al. |
| 5,527,096 A | 6/1996 | Shimer |
| 5,551,413 A | 9/1996 | Walk |
| 5,594,974 A | 1/1997 | Wattron et al. |
| 5,621,997 A | 4/1997 | Pearce |
| 5,622,404 A | 4/1997 | Menne |
| 5,632,362 A | 5/1997 | Leitner |
| 5,640,741 A | 6/1997 | Yano |
| 5,692,762 A | 12/1997 | Obitts |
| 5,722,717 A | 3/1998 | Rettenberger |
| 5,772,234 A | 6/1998 | Luo |
| 5,774,936 A | 7/1998 | Vetter |
| 5,775,352 A | 7/1998 | Obitts |
| 5,816,650 A | 10/1998 | Lucas, Jr. |
| 5,915,712 A | 6/1999 | Stephenson et al. |
| 6,079,894 A | 6/2000 | Obitts |
| 6,082,468 A | 7/2000 | Pusateri et al. |
| 6,112,446 A | 9/2000 | Förster et al. |
| 6,161,896 A | 12/2000 | Johnson et al. |
| 6,189,914 B1 | 2/2001 | Worth et al. |
| 6,196,562 B1 | 3/2001 | Zhuang |
| 6,247,741 B1 | 6/2001 | Seel |
| 6,247,882 B1 | 6/2001 | Huang |
| 6,340,168 B1 | 1/2002 | Woleen |
| 6,347,777 B1 | 2/2002 | Webber et al. |
| 6,401,321 B2 | 6/2002 | Carey et al. |
| 6,467,785 B2 | 10/2002 | Toppses |
| 6,584,641 B1 | 7/2003 | Milbredt |
| 6,604,789 B1 | 8/2003 | Downing |
| 6,655,702 B2 | 12/2003 | Senger |
| 6,659,478 B2 | 12/2003 | Hallgrimsson et al. |
| 6,688,633 B2 | 2/2004 | van't Schip |
| 6,754,936 B2 | 6/2004 | Ereñaga |
| 6,810,560 B1 | 11/2004 | Tsai |
| 6,817,066 B1 | 11/2004 | Williams et al. |
| D501,432 S | 2/2005 | Møller |
| 6,886,216 B2 | 5/2005 | Graham et al. |
| 6,886,575 B2 | 5/2005 | Diamond |
| 7,182,179 B2 | 2/2007 | Tolfsen |
| 7,219,906 B2 | 5/2007 | Hallgrimsson et al. |
| 7,278,436 B2 | 10/2007 | Gale et al. |
| 7,290,742 B2 | 11/2007 | Wang |
| 7,377,285 B2 | 5/2008 | Karasin et al. |
| 7,445,216 B1 | 11/2008 | Chou |
| 7,587,852 B1 | 9/2009 | Harms |
| 7,837,205 B2 | 11/2010 | Simard |
| 7,841,257 B2 | 11/2010 | Tomandl |
| 7,980,415 B2 | 7/2011 | Crawley |
| 7,984,724 B1 | 7/2011 | Eberle |
| 8,020,679 B2 | 9/2011 | Wu |
| 8,083,239 B2 | 12/2011 | Liu |
| 8,087,127 B2 | 1/2012 | Dayt |
| 8,157,273 B2 | 4/2012 | Bar-Lev |
| 8,167,351 B2 | 5/2012 | Plowman |
| 8,251,380 B2 | 8/2012 | Liu |
| 8,251,391 B2 | 8/2012 | Kohler et al. |
| 8,313,066 B2 | 11/2012 | Hampton et al. |
| 8,424,215 B2 | 4/2013 | Quintiliani et al. |
| 8,434,171 B2 | 5/2013 | Wang |
| 8,448,960 B2 | 5/2013 | Liu |
| 8,505,936 B2 | 8/2013 | Liu |
| 8,517,399 B2 | 8/2013 | Liu |
| 8,573,613 B2 | 11/2013 | Liu |
| 8,602,424 B2 | 12/2013 | Liu |
| D697,163 S | 1/2014 | Bietsch |
| 8,801,073 B1 | 8/2014 | Gray, Jr. et al. |
| 8,857,093 B2 | 10/2014 | Hogue |
| 8,864,151 B1 | 10/2014 | Liu |
| 8,936,256 B2 | 1/2015 | Liu |
| 9,022,397 B1 | 5/2015 | Prettyman |
| 9,022,413 B2 | 5/2015 | Liu |
| 2002/0079663 A1 | 6/2002 | Hallgrimsson et al. |
| 2002/0093178 A1 | 7/2002 | Turner et al. |
| 2002/0140196 A1 | 10/2002 | Crouch et al. |
| 2003/0010368 A1 | 1/2003 | MacKinnon |
| 2003/0226584 A1 | 12/2003 | Serhan |
| 2004/0094999 A1 | 5/2004 | Volotsenko |
| 2005/0001398 A1 | 1/2005 | Serhan |
| 2005/0067804 A1 | 3/2005 | Tolfsen |
| 2005/0121481 A1 | 6/2005 | Chiu |
| 2005/0211285 A1 | 9/2005 | Cowie et al. |
| 2005/0248169 A1 | 11/2005 | Clark et al. |
| 2005/0250605 A1 | 11/2005 | Moore et al. |
| 2006/0059656 A1 | 3/2006 | Hackett |
| 2006/0156511 A1 | 7/2006 | Li |
| 2007/0199586 A1 | 8/2007 | Cheng |
| 2007/0283990 A1 | 12/2007 | Fernandez et al. |
| 2008/0042476 A1 | 2/2008 | Hei et al. |
| 2008/0093874 A1 | 4/2008 | Partch |
| 2008/0174084 A1 | 7/2008 | Gee |

(56) References Cited

U.S. PATENT DOCUMENTS

| | | |
|---|---|---|
| 2009/0033052 A1 | 2/2009 | Bradshaw et al. |
| 2010/0083994 A1 | 4/2010 | Liu |
| 2011/0030749 A1 | 2/2011 | Miller |
| 2011/0146027 A1 | 6/2011 | Tsal |
| 2011/0173861 A1 | 7/2011 | Roth |
| 2011/0187067 A1 | 8/2011 | Staggs |
| 2011/0241303 A1 | 10/2011 | Campbell |
| 2012/0043739 A1 | 2/2012 | Liu |
| 2012/0084940 A1 | 4/2012 | Tsal |
| 2012/0104710 A1 | 5/2012 | Liu |
| 2012/0133106 A1 | 5/2012 | Liu |
| 2012/0205882 A1 | 8/2012 | Staggs |
| 2012/0280463 A1 | 11/2012 | Liu |
| 2012/0299272 A1 | 11/2012 | Liu |
| 2013/0061893 A1 | 3/2013 | Nilsson |
| 2013/0168947 A1 | 7/2013 | Offord |
| 2013/0187356 A1 | 7/2013 | Hazeleger |
| 2013/0264787 A1 | 10/2013 | Cheng et al. |
| 2013/0320640 A1 | 12/2013 | Liu |
| 2014/0125037 A1 | 5/2014 | Andersen |
| 2014/0175841 A1 | 6/2014 | Liu |
| 2014/0284891 A1 | 9/2014 | Liu |
| 2014/0305249 A1 | 10/2014 | Liu |
| 2014/0312586 A1 | 10/2014 | Cheng et al. |
| 2014/0333040 A1 | 11/2014 | Liu |
| 2015/0048582 A1 | 2/2015 | Liu |

FOREIGN PATENT DOCUMENTS

| | | |
|---|---|---|
| CN | 102512310 A | 6/2012 |
| CN | 203544058 U | 4/2014 |
| DE | 10021151 A1 | 4/2002 |
| DE | 202004010326 U1 | 11/2004 |
| EP | 2090276 | 8/2009 |
| EP | 2522404 | 11/2012 |
| WO | 2006112779 A1 | 10/2006 |

OTHER PUBLICATIONS

International Search Report for International Patent PCT/CA2016/050978 dated Oct. 17, 2016.

International Search Report for International Patent PCT/CA2016/051017 dated Oct. 26, 2016.

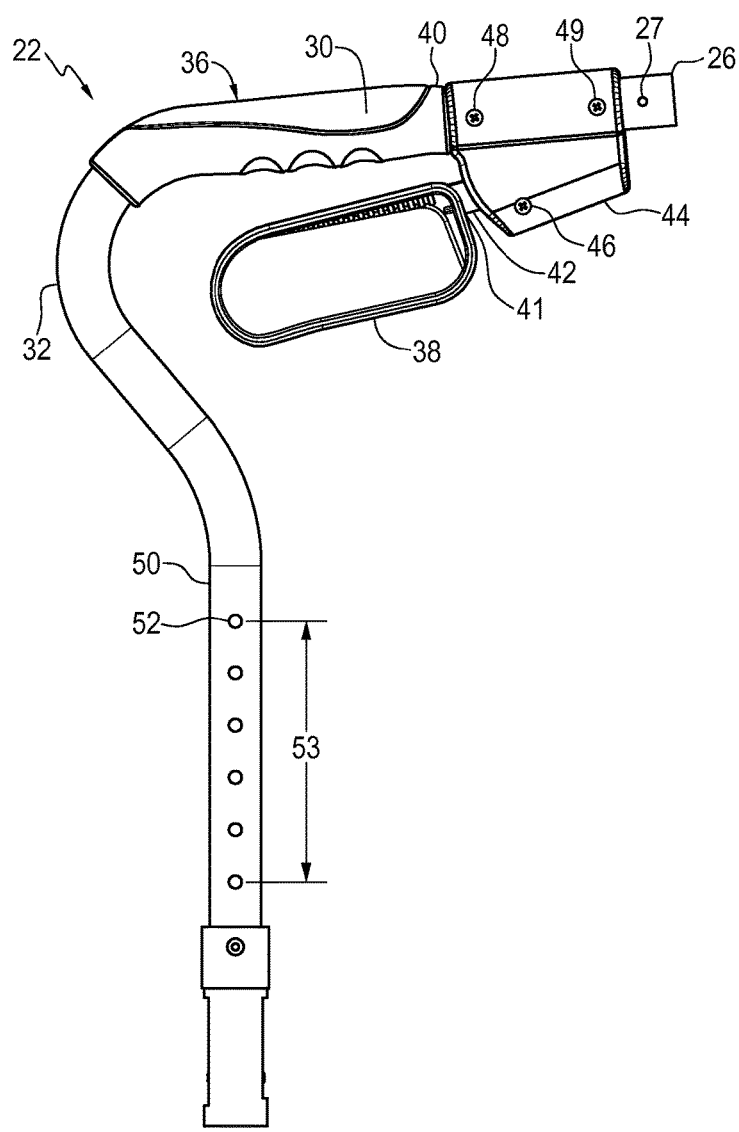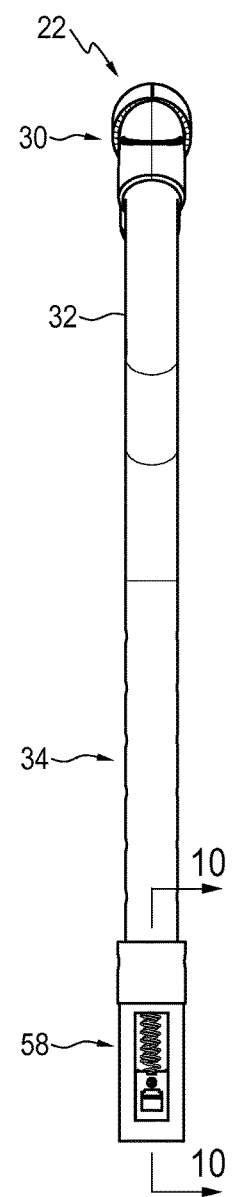
FIG. 5
FIG. 6

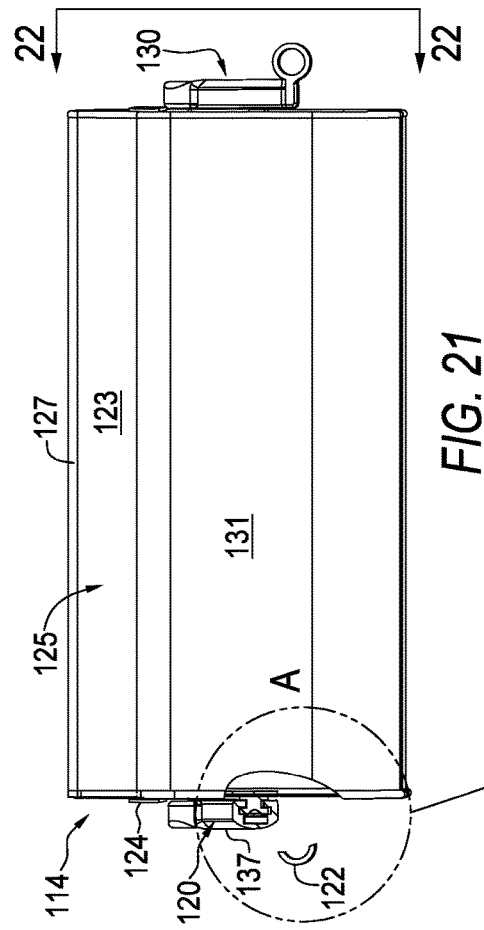
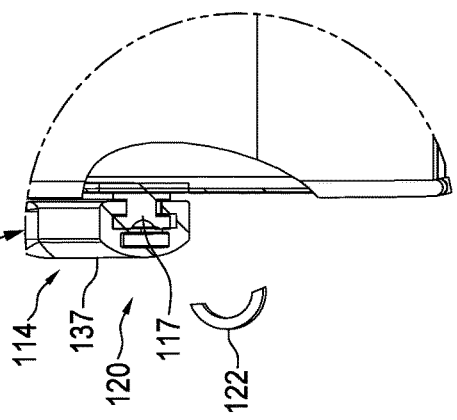
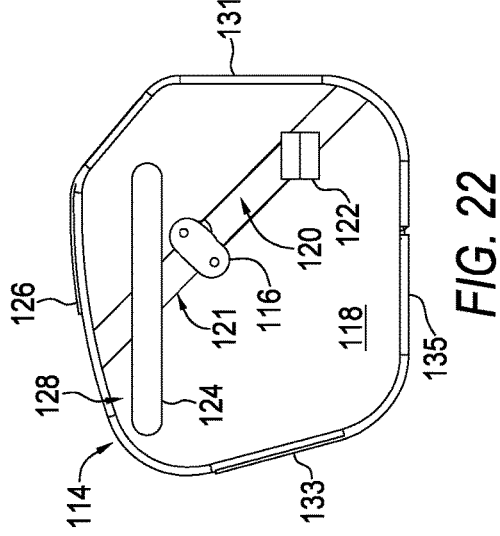
FIG. 21
FIG. 21A
FIG. 22

FOLDABLE WALKER APPARATUS

CROSS REFERENCE TO RELATED APPLICATION

This application is a continuation application of U.S. patent application Ser. No. 13/115,551 filed in the United States Patent and Trademark Office on May 25, 2011, which in turn is a divisional application of U.S. patent application Ser. No. 12/247,781 filed in the United States Patent and Trademark Office on Oct. 8, 2008, the disclosures of which are incorporated herein by reference and priority to which is claimed.

BACKGROUND OF THE INVENTION

Field of the Invention

The present invention relates to a foldable walker apparatus. More particularly, it relates to a foldable walker apparatus having a variety of optimized features relating to its folding mechanism, braking pad mechanism and brake housing, brake rod assembly, frame shape and collapsible basket.

Description of the Related Art

It is known to have foldable walkers. However, much of the prior art discloses walkers that require many parts and this may lead to additional manufacturing costs. On the other hand, some walkers have fewer parts but may suffer from a lack of robustness and rigidity, particularly in the lateral direction. This may lead to a compromise in the safety of such devices. Some walkers in their folded states remain bulky and difficult to manage. Still further known walkers suffer from having many parts that may tangle with one's clothing.

There are a great variety of frame shapes for walkers. In order to accommodate the variety of body shapes and circumstances that a user of walkers may encounter, a strong frame is needed. This has led to frames that have many parts, which may lead to further manufacturing costs. Alternatively, this has led to frames that are square or rounded-square in profile which are thicker and/or made of heavy duty metals. Such features may lead to a heavier, less manageable and therefore less enjoyable walker.

Many foldable walkers include baskets. However oftentimes these baskets need to be removed before the foldable walkers may be folded. Alternatively, many of these baskets require the foldable walker to fold from front to back. This may compromise the strength and rigidity of the frame of the foldable walker. Also, many of the baskets for walkers require many parts. This may act to increase manufacturing costs.

A variety of walkers have a housing over the brake pad mechanisms. However oftentimes this housing only partially extends over the brake pad. Even if the brake pad is covered by a housing, often the connecting and adjusting means for adjusting the brake pad protrudes outwards or is exposed for the user to adjust. As a result, some walkers of the prior art have brake pad mechanisms that are more prone to getting entangled with the user of the walker, which may lead to a great inconvenience and a safety concern for the user. Moreover, such walkers are more prone to breaking, and wear and tear, including damage such as thread-stripping of the connecting and adjusting means for the brake pad. This may lead to the considerable inconvenience, and extra expense to the user, or a premature need to replace the brake pad mechanism. It may also lead to a further compromised safety to the user if as a result the walker no longer brakes.

The use of a brake rod for walkers is known. Brake rods provide the advantage of enabling the walker's height to be adjusted without affecting brake cables disposed within the walker's telescoping tubes. However, some walkers require the two separate steps of 1) adjusting and fixing the height of the telescoping tubes through thumb screws and 2) fixing the brake rod to function accordingly. This is time consuming, requiring additional parts and thus manufacturing costs. It also may require a significant degree of dexterity which may therefore be challenging and therefore frustrating for the user of the walker. Some walkers combine the fixing of the height of the telescoping tubes with the fixing of the brake rods. However such walkers require that the length of the telescoping tubes be first fixed by the user in order to enable the brake rods to function. Therefore, if the user does not have the dexterity to fix the height of the telescoping tubes, or if the fixing mechanism for the telescoping tubes malfunctions or no longer works through damage or wear and tear, such as a stripping of the thumb screw, this means that the brake rod cannot be fixed and the braking function of the walker will not work. This may result in a walker braking mechanism that is less robust and less safe.

BRIEF SUMMARY OF INVENTION

An object of the present invention is to provide an improved walker apparatus that overcomes the above disadvantages.

More particularly, the present invention provides a walker apparatus with a folding mechanism that allows the walker to be folded laterally in a compact manner, and that minimizes the number of required parts while optimizing robustness and lateral support. A frame shape is provided with enhanced strength-to-weight and strength-to-number-of-parts ratios, as well as enhanced stability for the walker apparatus. A collapsible basket is provided that simply collapses laterally in conjunction with the walker, that is readily removable and that requires fewer parts. A brake housing is provided that more fully encloses and therefore protects the brake pad mechanism, including the means for connecting and adjusting the brake pad, which thereby provides a more streamline, more robust and safer walker apparatus. A brake rod is provided that is self-adjusting and thereby provides a more robust, user-friendly and safe walker apparatus.

According to one aspect, there is provided a folding mechanism for a walker apparatus. The folding mechanism includes a pair of spaced-apart inner frame members. Each of the inner frame members has a first part and a second part hingedly connected together. The folding mechanism includes a pair of link members diagonally extending between and pivotally connecting to the inner frame members. The link members operatively connect the inner frame members together.

According to another aspect, there is provided a walker apparatus. The walker apparatus includes a pair of spaced-apart, foldable inner frame members. The walker apparatus includes a pair of diagonally-extending link members. The link members connect the inner frame members together.

BRIEF DESCRIPTION OF DRAWINGS

The invention will be more readily understood from the following description of preferred embodiments thereof given, by way of example only, with reference to the accompanying drawings, in which:

FIG. 5 is a side elevation view of part of an outer frame member including a handle bar assembly, according to one embodiment of the invention;

FIG. 6 is a rear elevation view of the part of the outer frame member of FIG. 5;

FIG. 21 is a rear elevation view of the collapsible basket of FIG. 19;

FIG. 21A is an enlarged view of FIG. 21 illustrating a connection bracket and an insert shaped to be received by the connection bracket for thereby mounting the collapsible basket;

FIG. 22 is side elevation view of the collapsible basket shown along lines 22-22 of FIG. 21;

DESCRIPTION OF THE PREFERRED EMBODIMENTS

Figure 1:
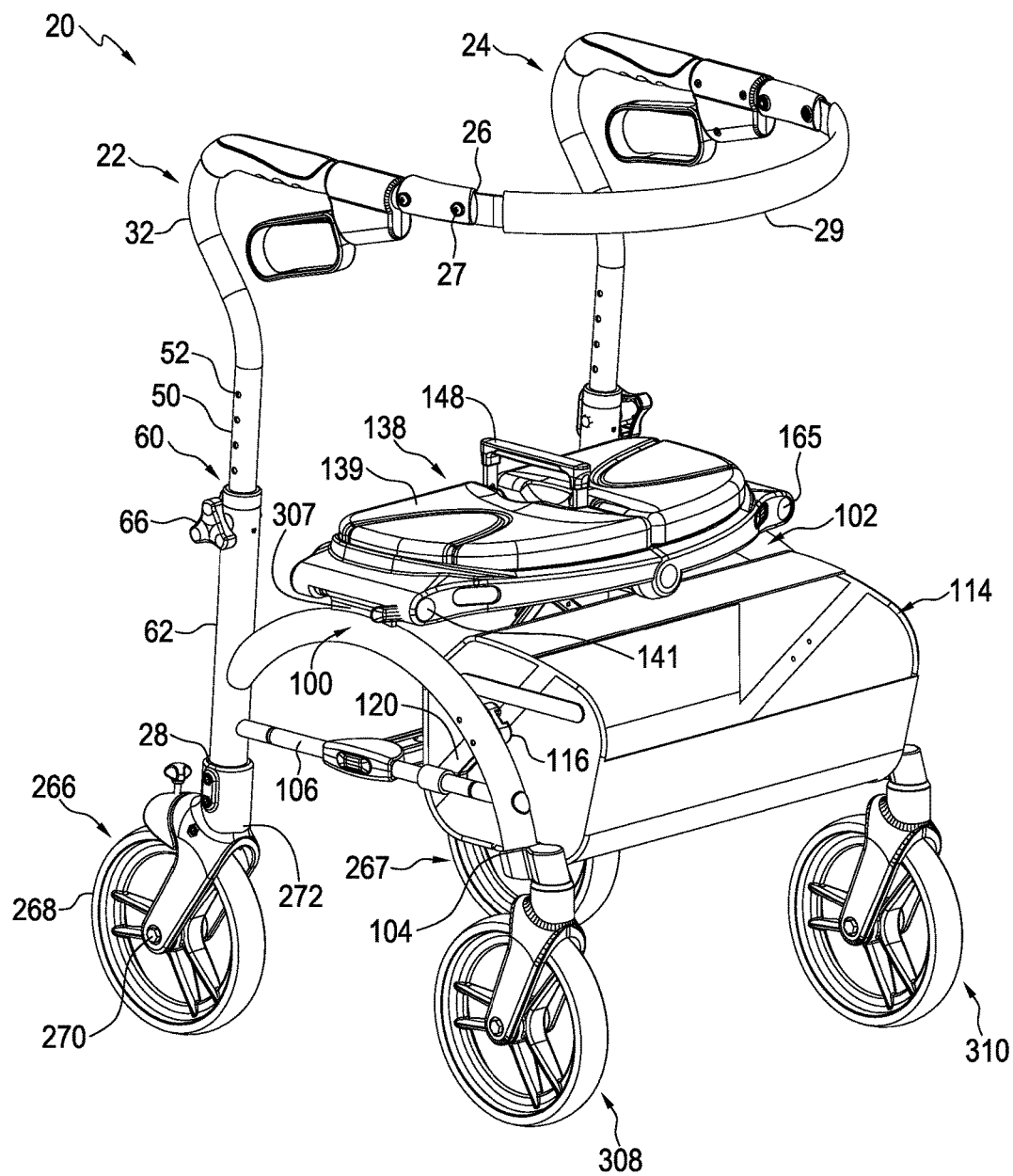
FIG. 1 is a top, front isometric view of a walker apparatus, according to one embodiment of the invention.
Figure 2:
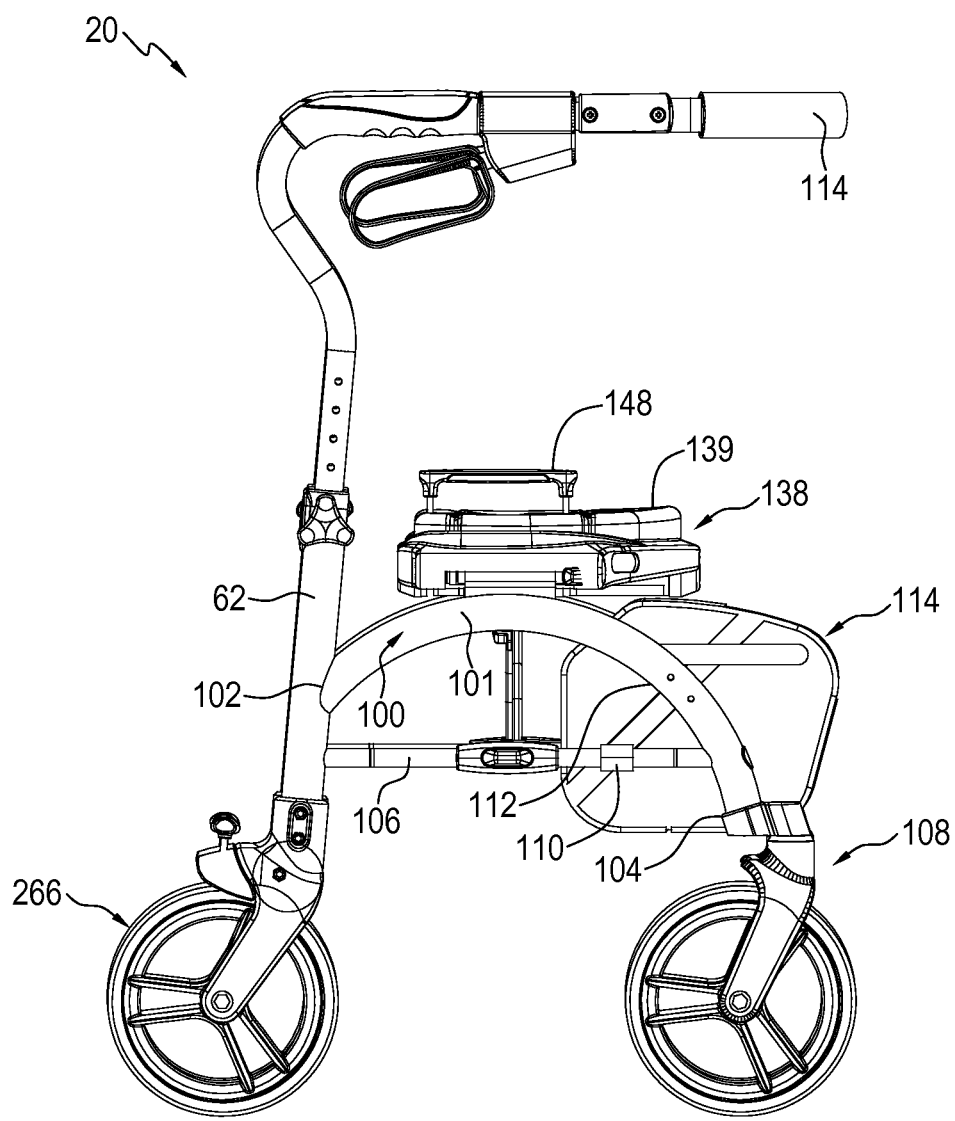
FIG. 2 is a side elevation view of the walker apparatus of FIG. 1.

Referring to the drawings and first to FIGS. 1 to 4, there is provided a walker apparatus in this example a foldable walker apparatus 20. The walker apparatus 20 includes a pair of upright, spaced-apart elongate members or outer frame members 22 and 24. As shown in FIG. 1, outer frame member 22 has an upper end 26 and a lower end 28 spaced-apart therefrom. A screw 27 located adjacent to the upper end connects to a backrest member 29. The same applies for outer frame member 24 and the backrest member 29 thereby connects the outer frame members 22 and 24 together at their upper ends. Each of the outer frame members has substantially the same parts and performs substantially the same functions and therefore only outer frame member 22 will be discussed in detail.

FIG. 5 shows part of the outer frame member 22 including a straight portion 40 with a handle bar assembly 36 extending outwards therefrom adjacent the upper end 26. The handle bar assembly 36 includes a grip pad 30 extending along the straight portion 40. The handle bar assembly 36 includes a handle bar housing 44 comprised of two halves secured together and secured to the straight portion 40 via screws 46, 48 and 49. The handle assembly 36 also includes a first handle lever 42 having a first end 41 with an actuator, in this example a gripping handle 38, extending therefrom. The handle bar assembly 36 is illustrated in greater detail in FIGS. 7 to 9 where one half of the handle bar housing 44 is partially removed to show an interior 45 of the handle bar housing 44.

Figure 7:
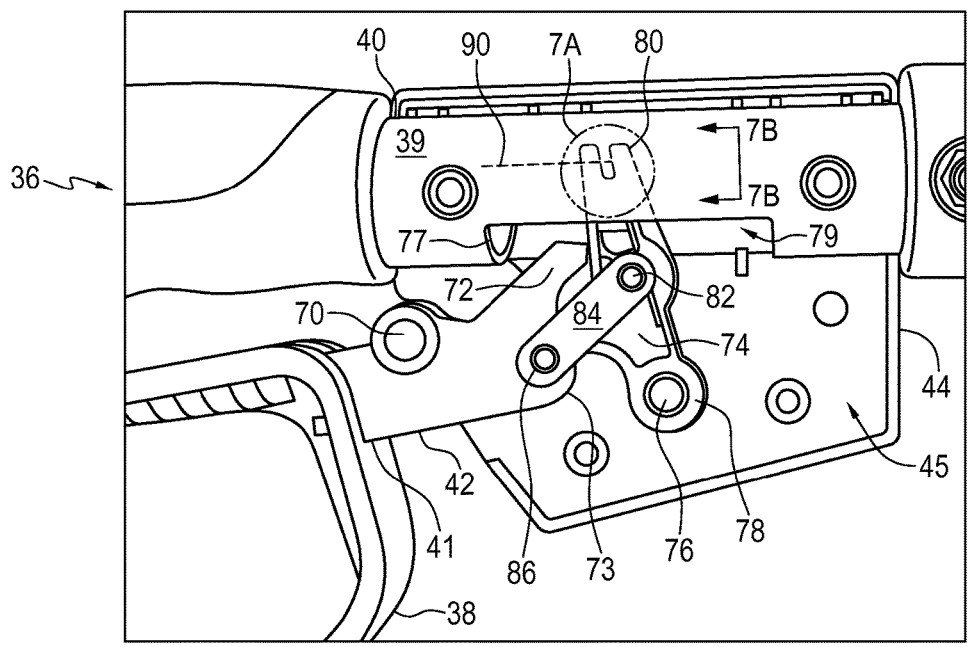
FIG. 7 is a partial, side elevation view of the interior of the handle bar assembly including a handle in a non-actuated mode.

Referring first to FIG. 7, this shows the handle bar assembly in an non-actuation mode. The first handle lever 42 is pivotally mounted via pivot 70 to the handle bar housing 44. The first handle lever 42 has a second end 72 spaced-apart from the first end 41. The first handle lever 42 includes a projection 73 interposed between the first end 41 and the second end 72. The second end 72 is positioned to be engageable a second handle lever 74.

The second handle lever 74 is pivotally mounted to the handle bar housing 44 via pivot 76 at a first end 78 of the second handle lever 74. The second handle lever 74 has a second end 80 spaced-apart from the first end 78. A link 84 pivotally connects together the first handle lever 42 to the second handle lever 74 via pivot 86 which is between ends 41 and 72 of the first handle lever, and pivot 82 which is between ends 78 and 80 of the second handle lever. The first handle lever 42, the second brake lever 74 and the link 84 may collectively be referred to as an actuation means for actuating a connection member or brake wire 90 when the gripping handle 38 is squeezed. As shown in FIG. 7C, the second handle lever 74 has a projection 75 between the first end 78 and the second end 80 that extends towards the projection 73 of the first handle lever 42. These are shown in FIG. 7C with the link 84 removed. Referring FIG. 7, the second end 80 of the second handle lever 74 extends within and is moveable within a recess 79 of a body 39 of the straight portion 40 of the outer frame member. An edge 77 is interposed between the body 39 and recess 79.

Figure 7A:
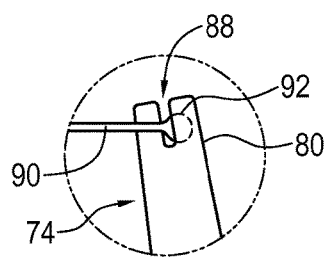
FIG. 7A is an enlarged up, side elevation view of a lever and brake wire connected thereto for the handle bar assembly of FIG. 7.
Figure 7B:
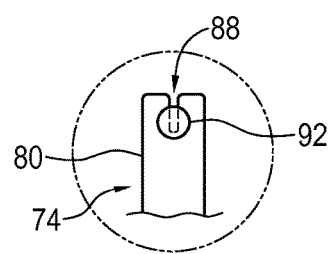
FIG. 7B is an enlarged view along lines 7B-7B of FIG. 7 illustrating the lever and brake wire connected thereto.
Figure 7C:
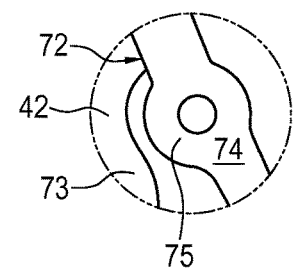
FIG. 7C is an enlarged, partial view of FIG. 7 showing a projection from a first handle lever and an adjacent projection from a second handle lever.

Referring to FIGS. 7A and 7B which show partially within the recess 79, the second end 80 includes a slot 88. The brake wire 90 is connected to the second handle lever 74 through a nipple 92 extending from the brake wire 90 and that slidably engages with the slot 88.

Figure 8:
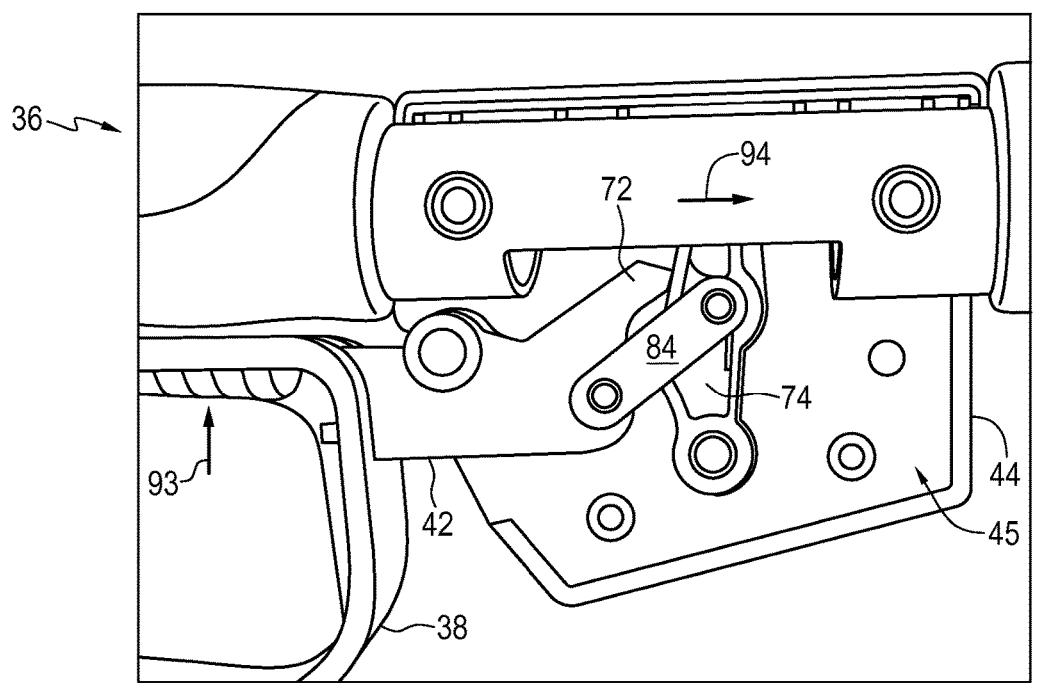
FIG. 8 is a partial, side elevation view similar to FIG. 7 with the handle is an actuated brake mode.

The handle bar assembly 36 may be positioned in an actuated, braking mode as shown in FIG. 8. When the gripping handle 38 is actuated or pulled upwards from the perspective of FIG. 8 as indicated by arrow 93, this causes the second end 72 of the first handle lever 42 to forcibly abut against and push the second handle lever 74 to the right, from the perspective of FIG. 8 as indicated by arrow 94. This thereby causes the brake wire 90 to be actuated.

Figure 9:
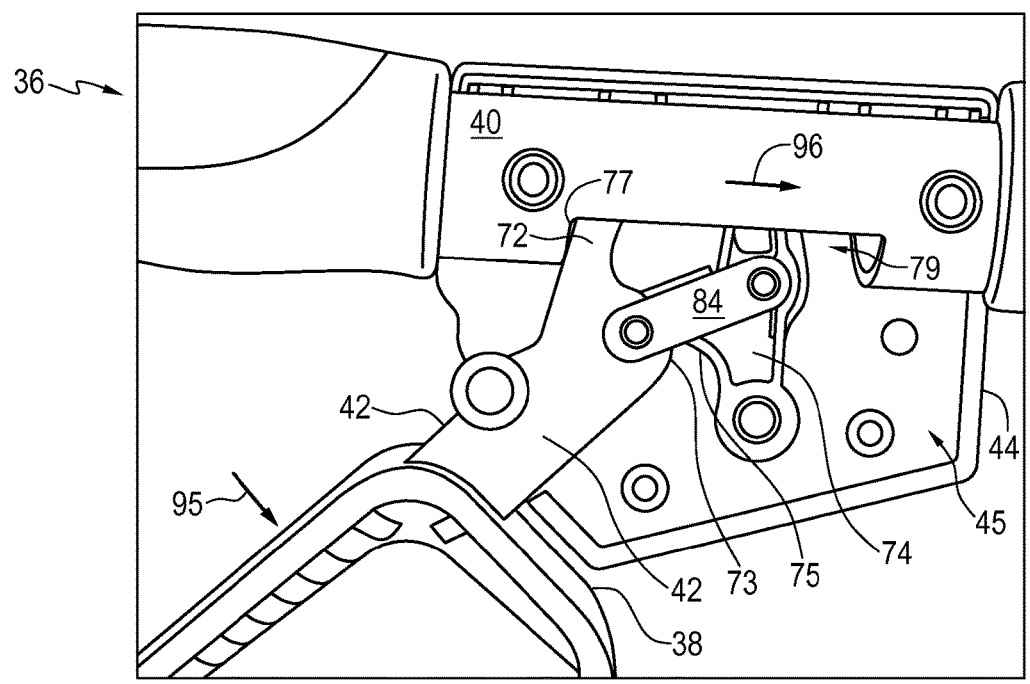
FIG. 9 is a partial, side elevation view similar to FIG. 7 with the handle is an actuated park mode.

The handle bar assembly 36 may be positioned in an actuated, parking mode as shown in FIG. 9. When the gripping handle is actuated or pushed downward from the perspective of FIG. 9, this causes the first end 72 of the first handle lever 42 to move within the recess 79 and abut against edge 77. Also, the projection 73 of the first handle lever 42 is caused to forcibly abut with the projection 75 of the second handle lever 74. The first handle lever 42 is thereby held in place by being wedged between the edge 77 of the straight portion 40 and the projection 75. The abutment of the projection 73 against projection 75 thereby causes the second handle lever 74 to move to the right from the perspective of FIG. 9 as indicated by arrow 96 and thereby actuate the brake wire 90.

Referring back to FIGS. 5 and 6, the frame member 22 has a bend 32 extending from the straight portion 40. Referring to both FIG. 1 and FIG. 5, the bend 32 extends to telescoping tubes 60 which include inner tube 50 and outer tube 62 shaped to receive the inner tube 50. The straight portion 40, the bend 32 and telescoping tubes 60 together provide a rounded L-shape for the outer frame member 22. Tube 50 has a plurality of spaced-apart apertures 52 which define an adjustment range 53, as shown in FIG. 5. A means for locking the telescoping tubes together, in this example a thumb screw 66, shown in FIG. 1, may be inserted through one of said apertures to fixedly adjust the height of the telescoping tubes 60, as is well known to those skilled in the art. This thereby enables the height of the walker apparatus to be adjusted to provide an optimized height for the user.

Figure 10:
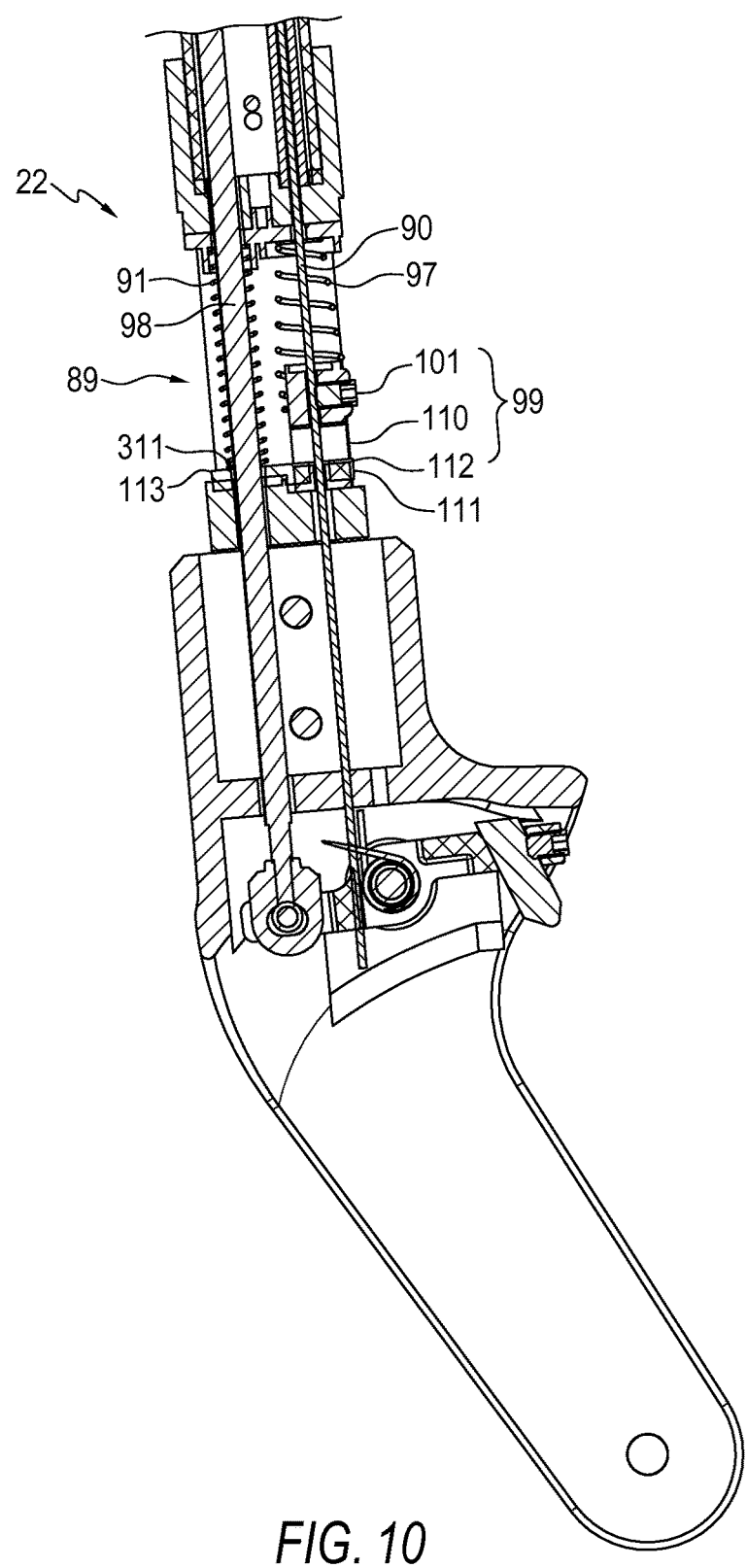
FIG. 10 is a side partial view of the outer frame member in section along lines 10-10 of FIG. 6 to illustrate a brake rod assembly according to one embodiment of the invention.

FIG. 10 shows part of the outer frame member 22 partially in section to reveal a brake rod assembly 89. The brake rod assembly 89 includes a brake rod 98 which extends within inner tube 50 of FIG. 5. The brake rod 98 in this example has a hexagonal cross-section. A coil spring 91 extends about the brake rod 98. A gripping member 99 is adjacent to and is slidably engageable with the brake rod 98 along a distance equal to the adjustment range 53 of FIG. 5. The gripping member 99 in this example includes a clamp 101 that engages with the brake wire 90 via a set screw 101. A coil spring 97 wraps around brake wire 90 above the clamp 101 from the perspective of FIG. 10. The coil spring 91 and the coil spring 97 bias the gripping member 99 downwards, from the perspective of FIG. 10, towards a non-actuated mode. The gripping member 99 also includes a block 110 and plate 112, in this example a metal plate, that both also engage with the brake wire 90 near a first end 111 of the metal plate. The metal plate 112 has an aperture 311 near a second end 113 of the metal plate spaced-apart from the first end 111. The brake rod 98 passes through the aperture 311. The metal plate 112 is slidably engageable with the brake rod 98.

Figure 11:
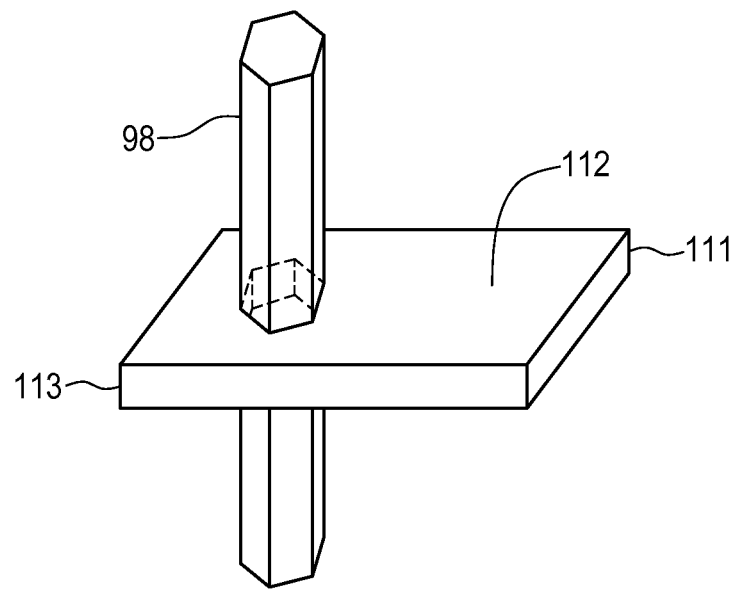
FIG. 11 is an enlarged, partial elevation view of the brake rod with a gripping member according to one embodiment of the invention slidably connected thereto in a non-actuated mode.
Figure 12:
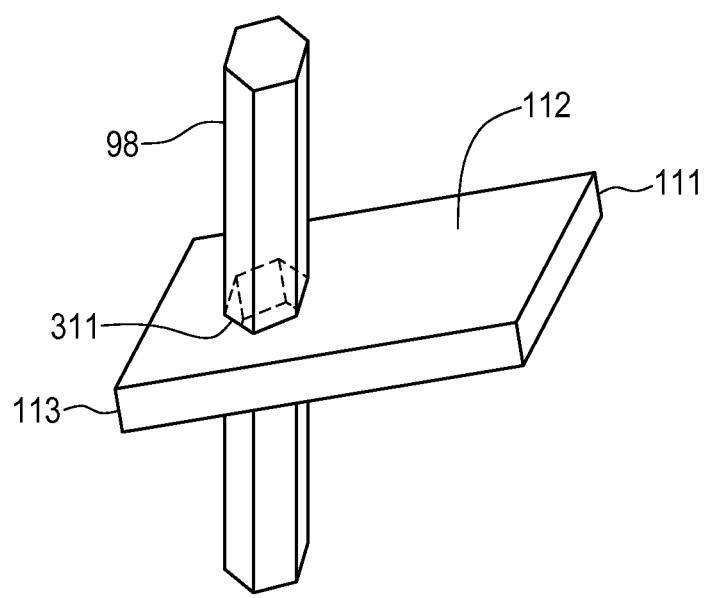
FIG. 12 is an enlarged, partial elevation view similar to FIG. 11 with the gripping member engaging the brake rod in an actuated mode.

FIG. 11 shows the metal plate 112 and the brake rod 98 of FIG. 10 in isolation. The metal plate 112 slidably receives the brake rod 98 in a non-actuated mode. The brake wire 90 is operatively connected adjacent to the first end 111 as seen in FIG. 10. When the brake wire 90 is actuated or pulled upwards from the perspective of FIGS. 10 and 11, the first end 111 of the metal plate moves upward as indicated by FIG. 12. The plate is thereby caused to tilt, with the aperture 311 abutting and engaging the brake rod 98. The metal plate 112 thereby is able to grip the brake rod 98. The brake wire 90 continues to be pulled upwards when actuated and this causes the metal plate, and in turn, the brake rod 98, to move upwards in unison with the brake wire 90.

Referring back to FIG. 1, a first pair of wheel assemblies 266 and 267 are rotatably mounted to the outer frame members 22 and 24. In this example both wheel assembly 266 and wheel assembly 267 are structurally and functionally the same. Accordingly, only wheel assembly 266 will be discussed in detail.

Figures 13, 14:
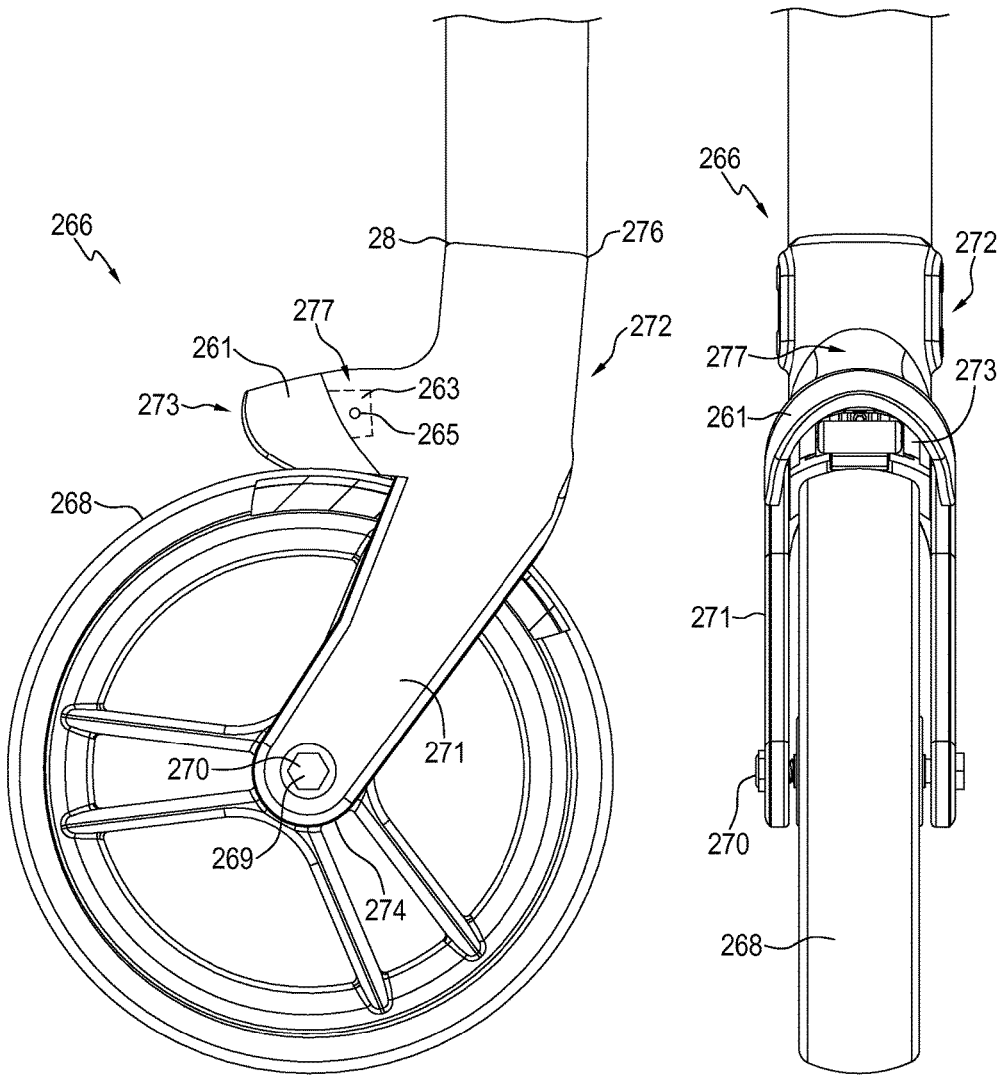
FIG. 13 is a side elevation view of a wheel assembly illustrating a brake housing according to one embodiment of the invention.
FIG. 14 is a rear elevation view of the wheel assembly and brake housing.

Referring to FIGS. 13 and 14, the wheel assembly 266 includes a brake pad assembly 272. The brake pad assembly 272 has a proximal end 276 that connects to the lower end 28 of the outer frame member 22. The brake pad assembly 272 has a bracket housing 271 that receives a ground-engaging wheel 268 at a distal end 274 of the brake pad assembly which is spaced-apart from the proximal end 276. An aperture 270 near the distal end 274 connects to the wheel 268 via a wheel axis 269. The brake pad assembly 272 includes a brake housing 277 between the proximal end 276 and the distal end 274. The brake housing 277 extends overtop of and along at least a portion of the wheel 268 and includes an interior 273. The brake housing 277 includes a removable covering portion 261 that has an inner portion 263 within the interior 273 and which connects to the rest of the brake housing by means of a screw 265 which his Allen key removable in this example.

Figure 15:
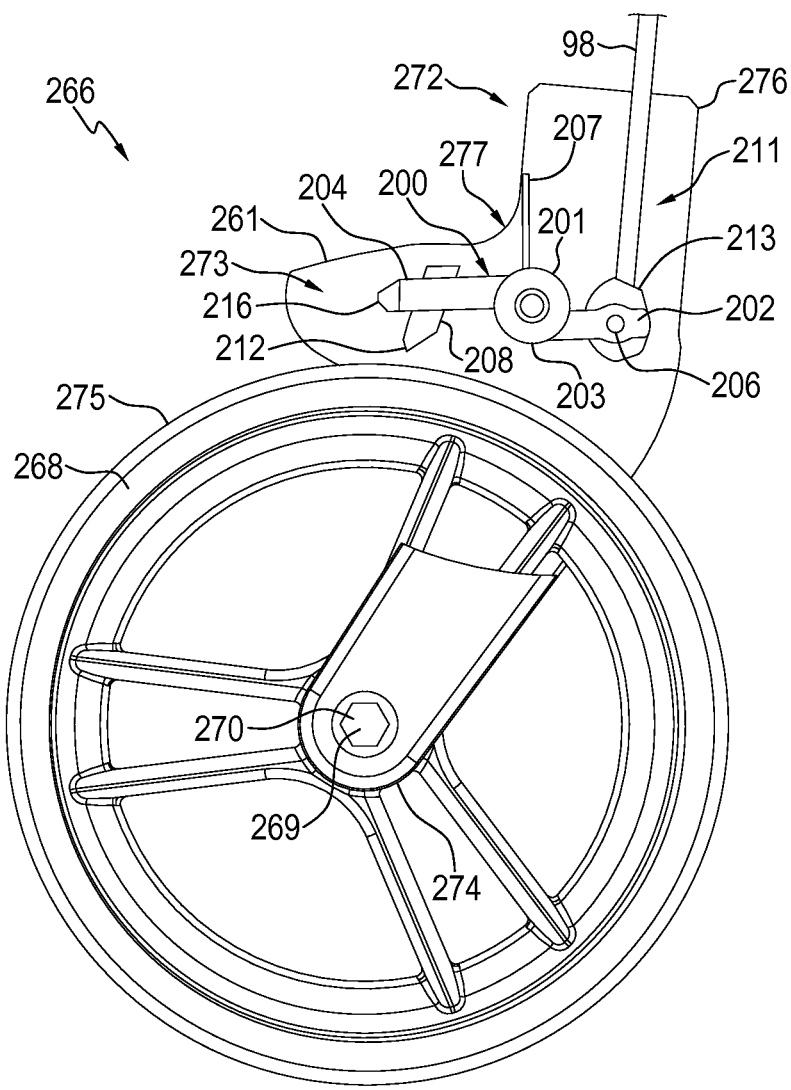
FIG. 15 is a side elevation view similar to FIG. 13 with the brake housing partially in section to illustrate a brake pad assembly in a non-actuated mode.
Figure 16:
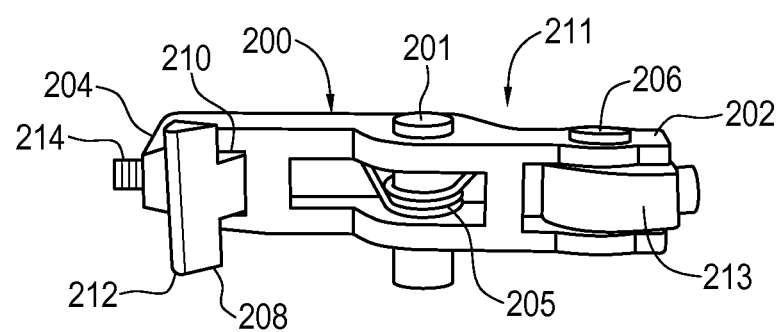
FIG. 16 is bottom plan view of the brake pad assembly of FIG. 15.
Figure 17:
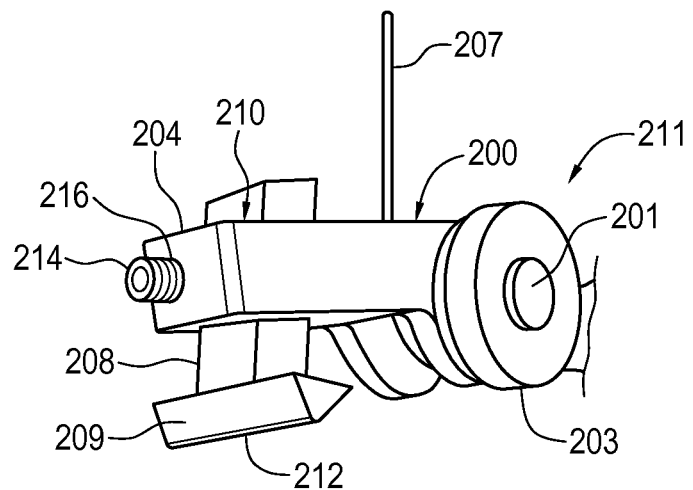
FIG. 17 is a rear perspective view of the brake pad assembly of FIG. 16 illustrating a brake pad and a means for fixing and adjusting the brake pad.

FIG. 15 shows the wheel assembly 266 with the brake housing 277 partially removed to show the interior 273. The brake pad assembly 272 includes a brake pad mechanism 211 located within the interior 273. The brake pad mechanism 211 includes a brake pad lever 200 pivotally mounted to the brake housing 277 via pivot rod 201 as best shown in FIG. 16. Bushings 203 on both ends of the pivot rod 201 are interposed between the brake pad lever 200 and the brake housing 277. A spring 205 is coiled around the pivot rod 201 and, as shown in FIG. 17, includes an outer portion 207 that extends outwardly away from the brake pad lever 200. The brake pad lever 200 has a first end 202 with a pivot 213 that connects to the brake rod 98. The brake pad lever 200 also has a second end 204 which is opposite the first end 202.

Figure 18:
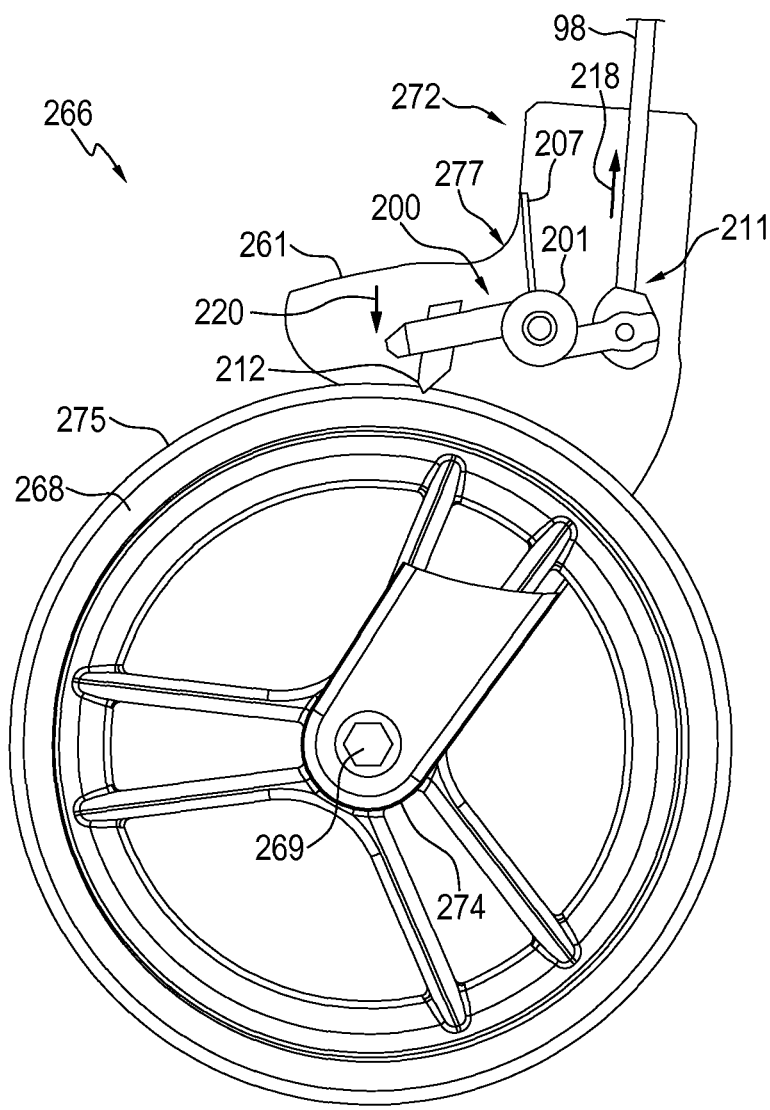
FIG. 18 is a side elevation view similar to FIG. 15 illustrating the brake pad assembly in an actuated mode with the brake pad engaging the wheel.
Figure 19:
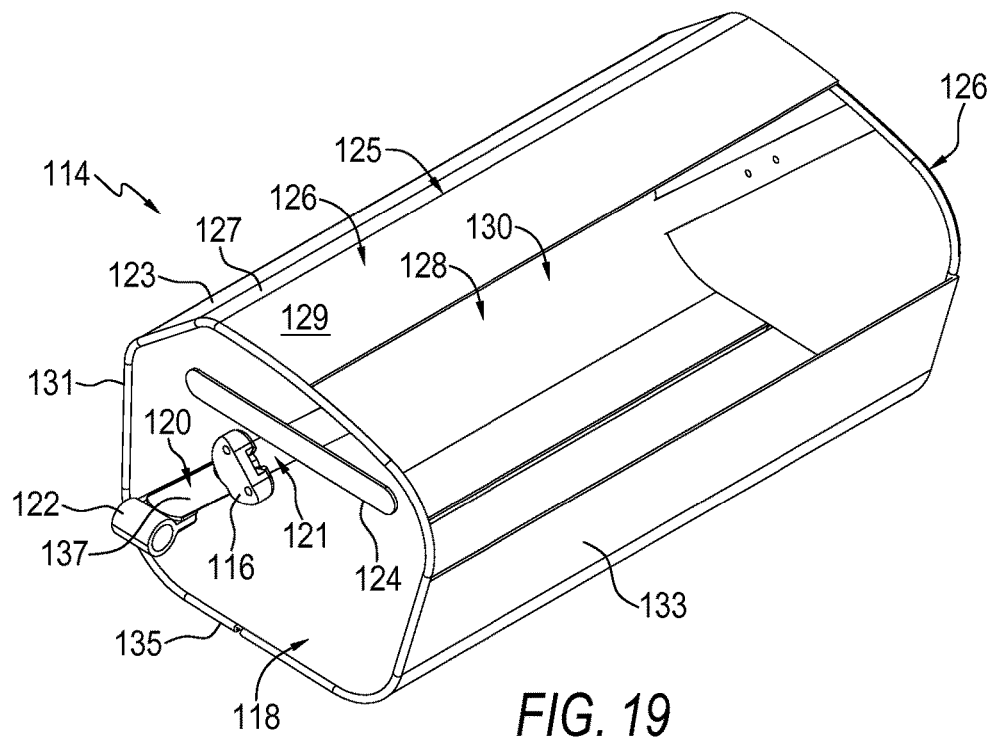
FIG. 19 is a top, front isometric view of a collapsible basket according to one embodiment of the invention.
Figure 20:
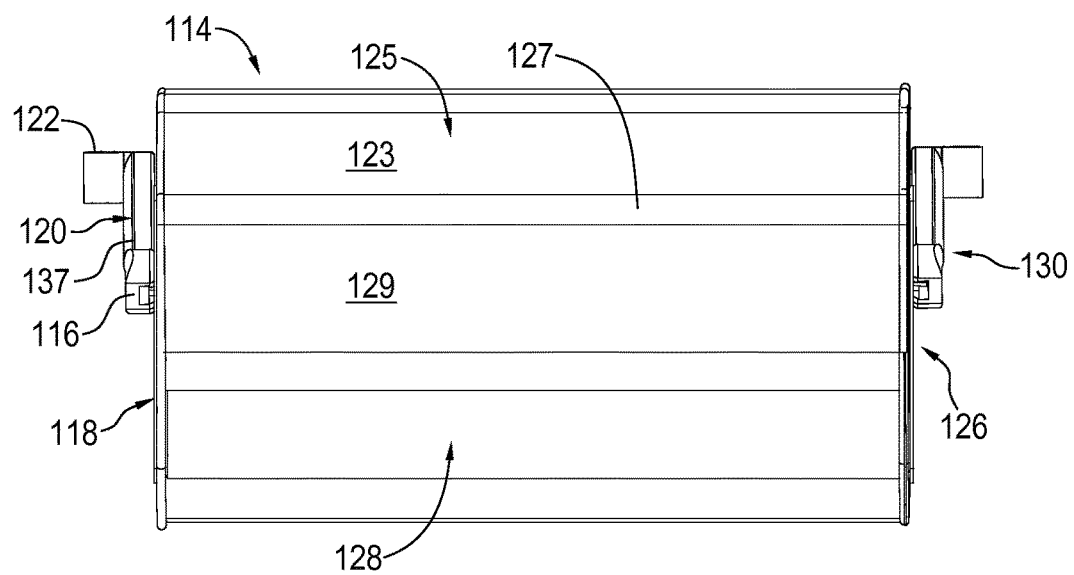
FIG. 20 is a top plan view of the collapsible basket of FIG. 19.

A brake pad 212 is located near the second end 204. As best shown in FIG. 17, it includes an elongate part 208 that is slidably insertable within a slot 210. The brake pad 212 extends outwards from the slot 210 towards an outer periphery 275 of the wheel 268 shown in FIG. 18. The brake pad 212 includes a contact part 209 extending parallel to the wheel axis 269 shown in FIG. 15 for engaging the wheel 268. The brake pad 212 as a result is T-shaped in this example.

The brake pad mechanism 211 includes a means 214 for connecting the brake pad 212 within the slot 210 and for adjusting the position of the brake pad 212 relative to the wheel 268. The means 214 for connecting and adjusting is located at the second end 204 of the brake pad lever 200, as best shown in FIG. 17. In this example, the means for connecting and adjusting 214 is an Allen key adjustable screw that passes through aperture 216 to releasably abut the elongate part 208 of the brake pad 212. Referring to FIG. 15, the covering portion 261 is adjacent to the means 214 for connecting and adjusting. The brake housing 277 extends around the brake pad mechanism 211, including the means 214 for connecting and adjusting, to at least the outer periphery 275 of the wheel 268 for fully protecting the brake pad mechanism 211 thereby. Advantageously, the means 214 for connecting and adjusting is accessible upon removal of the covering portion 261.

The brake pad lever 200 is spring-biased via the outer portion 207 of the spring 205, which abuts against the brake housing 277 as shown in FIG. 15, to position the brake pad 212 spaced-apart from and adjacent to the outer periphery 275 of the wheel 268.

In operation, to brake the walker apparatus, the braking handle is either pulled upwards in the direction of arrow 93 for braking as shown FIG. 8 or pushed downwards for parking as shown in FIG. 9. Either of these actions operatively actuates the brake wire 90, which in turn actuates the gripping member 108 to engage or actuate the brake rod 98, as shown in FIG. 12. When brake rod 98 is actuated or moved upward from the perspective of FIG. 18, the brake pad lever 200 causes the brake pad 212 to engage the wheel 268 for inhibiting rotation of the wheel.

Referring back to FIG. 1, the walker apparatus 20 has a second pair of ground-engaging wheel assemblies 308 and 310. These wheel assemblies 308 and 310 are similar to wheel assemblies 266 and 267 with the exception that they do not include brake pad assemblies or mechanisms.

Figure 3:
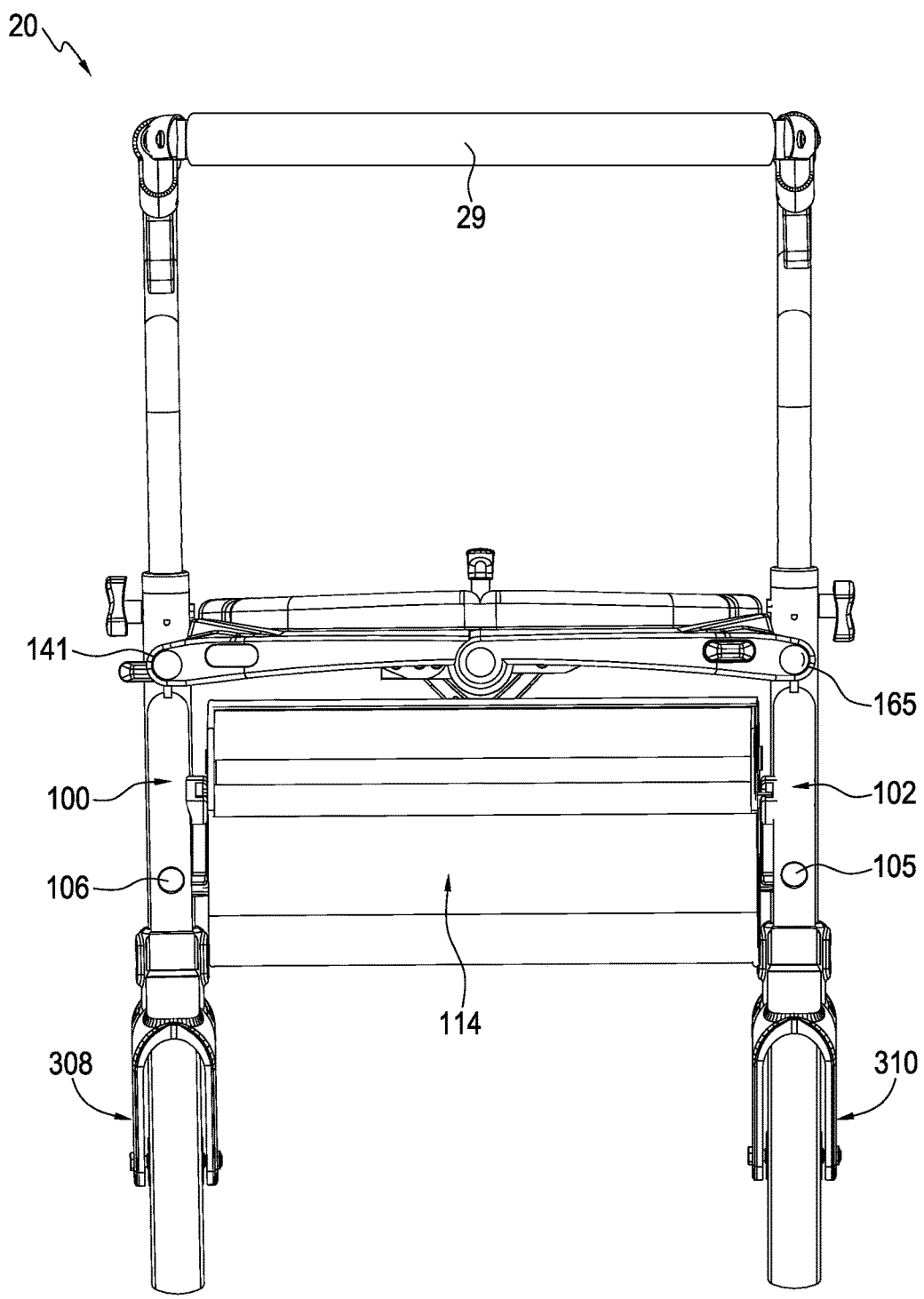
FIG. 3 is a front elevation view of the walker apparatus of FIG. 1.
Figure 4:
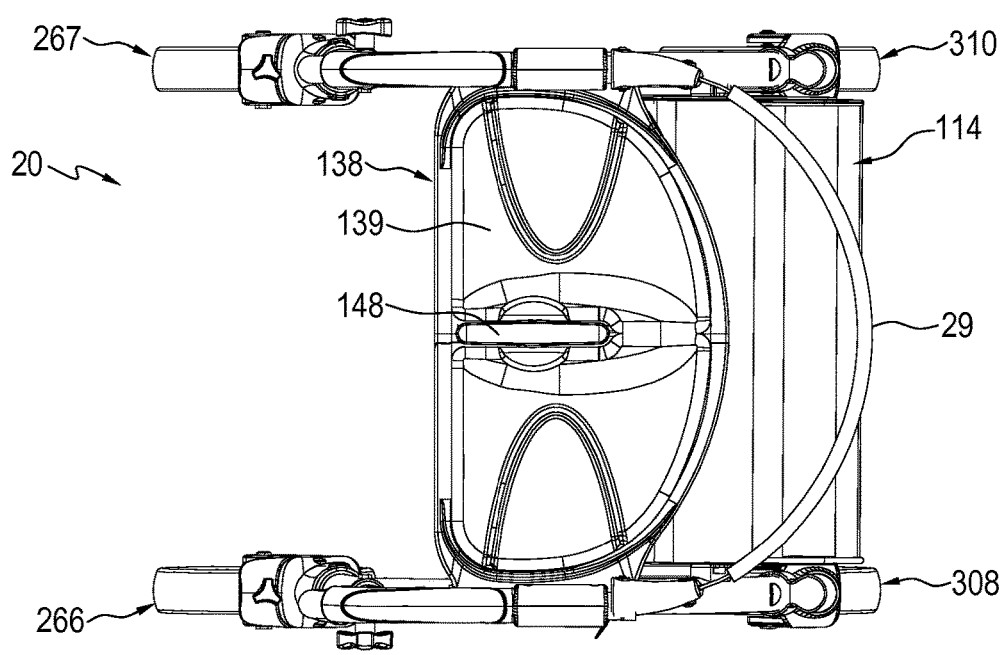
FIG. 4 is a top plan view of the walker apparatus of FIG. 1.

A pair of spaced-apart support members 100 and 102 connect together the first and second pair of wheel assemblies, as best shown in FIGS. 1 and 3. Each support member is the substantially the same and has the same structure and function. Only support member 100 will be discussed in detail. Support member 100 aligns with and extends via a proximal end 61 from the tube 62 of the outer frame member 22 to a distal end 104 of the support member which connects to wheel assembly 308. The support member 100 is arc-shaped and partially circular. The support member 100 has an apex 307. The apex 307 is the most elevated point of the support member 100 from the perspective of FIG. 1. The apex extends towards the upper end 26 of the elongate member 22. A seat 139 for resting, which includes an extendable and retractable seat handle 148, connects to the apexes of the support members. The support members thereby support the seat 139. A rod 106 extends from the tube 62 of the outer frame member 22, adjacent end 61 of support member 100 as seen in FIG. 1, to near the distal end 104 of the support member 100. The same applies with respect to rod 105 for corresponding support member 102 as partially shown for example in FIG. 3.

The foldable walker apparatus includes a collapsible basket 114 that extends between the support members 100 and 102. The collapsible basket 114 is best shown in FIGS. 19 to 22. The collapsible basket 114 includes a basket member 125 made in this example of flexible fabric. The term fabric is used in the broadest sense of the word, and may include non-woven material, plastic, flexible sheets and other such materials. The basket member 125 in this example has a top 126 with abutting faces 123, 127 and 129. The top 126 has an opening 128 for inserting objects into an interior 130 of the basket member. The basket member 125 includes sides 131 and 133 that extend downwards from the top 126 from the perspective of FIG. 19. The sides 131 and 133 in this example are made of netting. A bottom 135 opposite the top 126 connects the sides 131 and 133. The bottom 135 in this example is made of continuous, non-netted fabric.

The collapsible basket 114 includes spaced-apart end members 118 and 126. Each end member, such as end member 118, is flat and includes a rigid peripheral portion which in this example is 5-sided wire frame 131. The basket member 125 extends between and is supported by the wire frame of the end members. The end members are moveable towards each other when the walker apparatus is folded due to the flexibility of the basket member 125. The basket member may thereby fold to collapse the collapsible basket 114 when folding the walker apparatus. Importantly, this is possible without needing to remove the collapsible basket 114 from the walker apparatus.

Each of the end members is substantially the same with the same structure and function. Only end member 118 will be discussed in detail. End member 118 in this example includes an insert 121 which diagonally extends from the top 126 to the side 131 as shown in FIG. 22. The end member 118 may include a flap member 124 to further secure the insert 121 to the end member 118. The insert 121 includes an extended grooved projection 117 as best shown in FIG. 21A.

A connection bracket 120 is shaped through a grooved housing 137 to slidably receive the grooved projection 117. The groove housing 121 is best shown in FIG. 21A, which shows the connection bracket 120 partially in section. Referring back to both FIG. 19 and FIG. 1, the connection bracket 120 includes a first connector 116 which fastens the connection bracket 120 to the support member 100 near the distal end 104 of the support member 100. The connection bracket 120 includes a second connector 122 spaced-apart from the first connector 116 by the grooved housing 137. The second connector 122 fastens the connection bracket 120 to the rod 106. A substantially similar connection bracket 130 corresponds to the corresponding support member 102 and rod 105. The collapsible basket 114 is thereby slidably securable with and removable from the walker apparatus 20.

Figure 23:
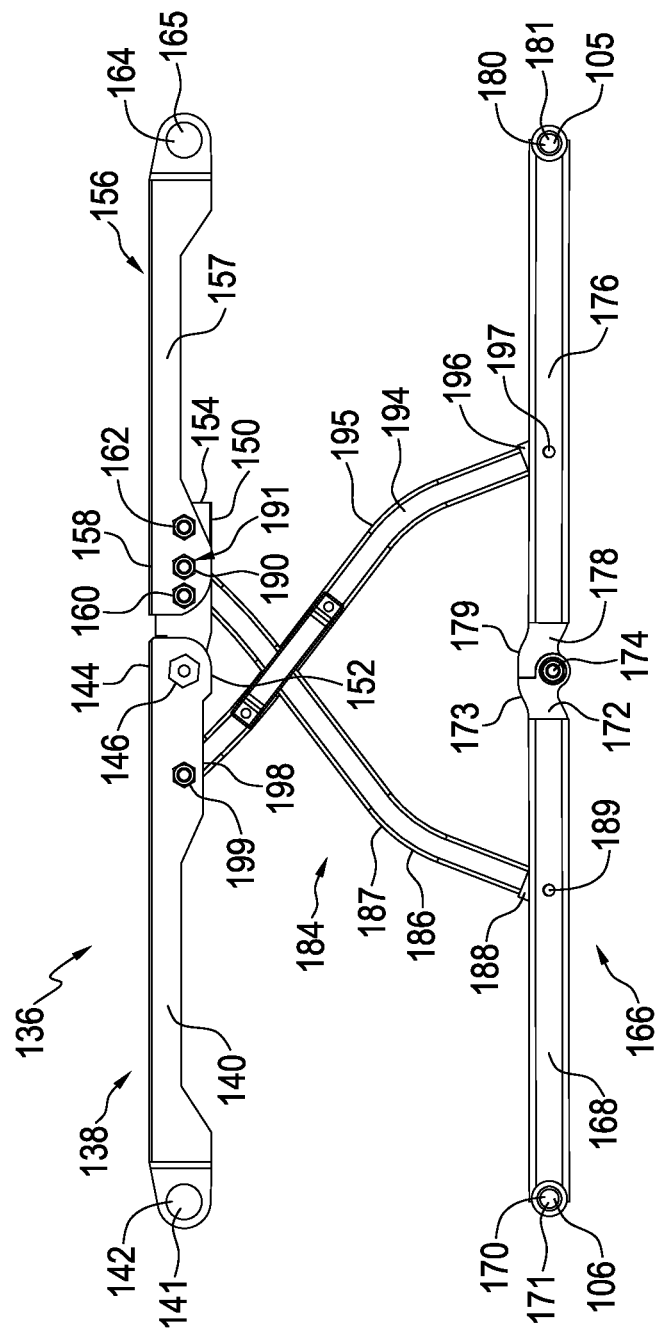
FIG. 23 is a front elevation view of a folding mechanism in an extended mode, according to one embodiment of the invention.
Figure 24:
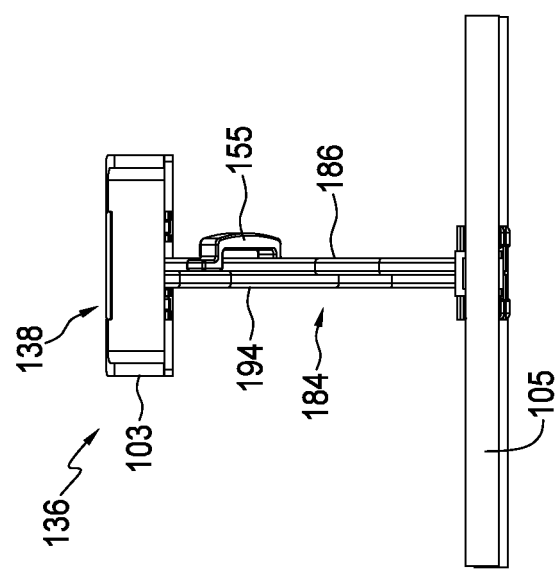
FIG. 24 is a side elevation view of the folding mechanism of FIG. 23.
Figure 25:
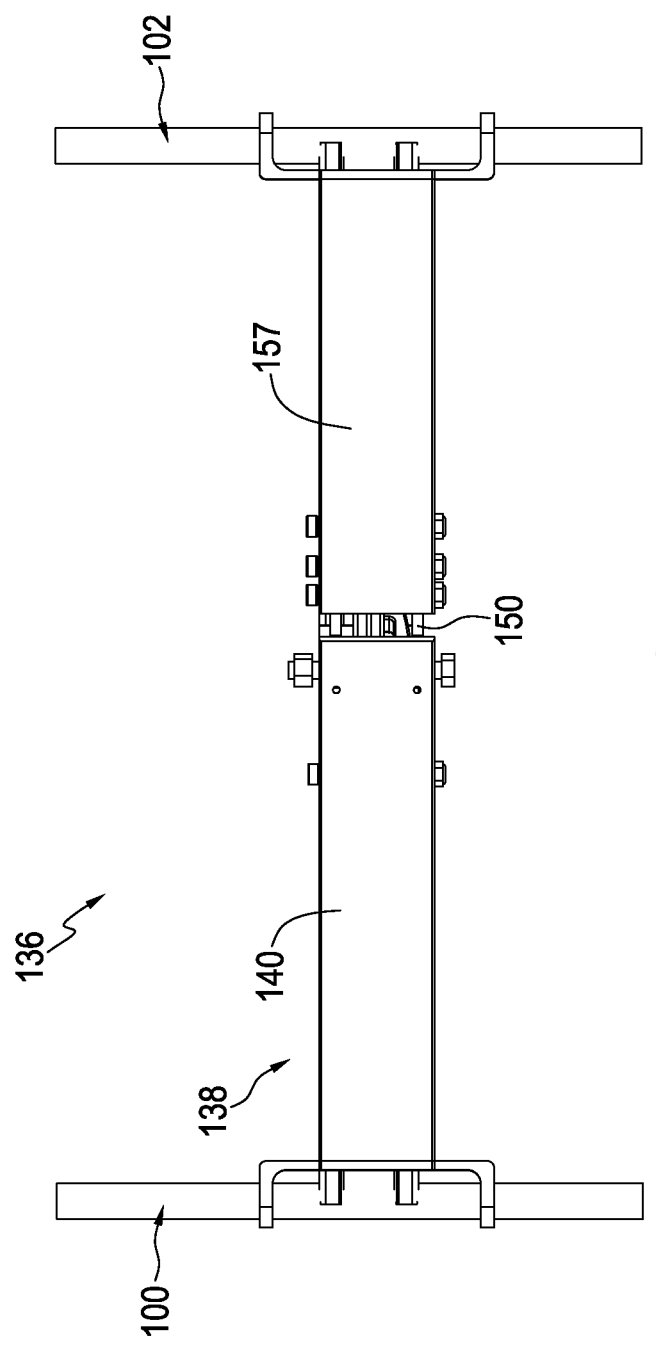
FIG. 25 is a top plan view of the folding mechanism of FIG. 23 in the extended mode.

The walker apparatus 20 includes a folding mechanism 136 as best shown in an unfolded mode in FIGS. 23 to 25. The folding mechanism may be referred to as a means for bringing together the frame members 22 and 24 for folding the walker. The folding mechanism 136 includes a pair of spaced-apart inner frame members 138 and 166. Inner frame member 136 includes a first part 140 and a second part 157. The first part 140 has a first end 142 that pivotally receives and thereby pivotally connects to the support member 100 via a first extended pivot rod 141, as shown by FIG. 23 in combination with FIG. 1. The first part 140 has a second end 144 spaced-apart from the first end 142. A pivot 146 at the second end 144 pivotally connects the first part 140 to a hinge member 150.

The second part 157 includes a first end 158 with a bolt 160 that connects the second part 157 to the hinge member 150. Bolt 162 near the first end 158 also connects the second part 157 to the hinge member 150. The first part 140 and the second part 157 of the inner frame member 138 are thereby hingedly connected together. The second part 157 has a second end 164 which is spaced-apart from the first end 15.

The second end pivotally receives and thereby pivotally connects to the support member 102 via a second extended pivot rod 165, as shown by FIG. 23 in combination with FIG. 1.

The inner frame member 166 includes a first part 168 and a second part 176 that are pivotally connected together via pivot 174. The first part 168 has a first end 170 with a connector 171 that pivotally receives and thereby pivotally connects with the rod 106. The first part 168 has a second end 173 with teeth 172 extending therefrom above and over top of the pivot 174. The second part 176 has a first end 179 with teeth 178 extending therefrom above and over top of the pivot 174. The teeth 172 and 178 are positioned to inter-engage in an over-the-center action in the extended mode and thereby inhibit further movement of the inner frame members towards the lower ends of the outer frame members. The second part has a second end 180 with a connector 181 that pivotally receives and thereby pivotally connects with the rod 105.

The folding mechanism 136 includes a pair of link members 184 including a first link member 186 and a second link member 194 which form an x-shaped arranged when fully open. The first link member 186 pivotally connects at a first end 188 via pivot 189 to the first part 168 of the inner frame member 166. The first link member 186 pivotally connects at a second end 190 via pivot 191 to the second part 157 of the inner frame member 157 near the first end 158. The first link member 186 includes a bend 187 that extends outwardly towards the adjacent outer frame member 22. In this example, the bend 187 extends towards the first end 142 of the first part 140 of the inner frame member 138.

The second link member 194 pivotally connects at a first end 196 via pivot 197 to the second part 176 of the inner frame member 166. The second link member 194 pivotally connects at a second end 198 via pivot 199 to the first part 140 of the inner frame member 138 near the second end 144. The second link member 194 includes a bend 195 that extends outwardly towards the outer frame member 24. In this example, the bend 195 extends towards the second end 164 of the second part 157 of the inner frame member 138. A square bracket 155 outwardly extends from the second link member 194 to enable the first link member 186 to slidably pass therethrough. The pair of link members 184 thereby diagonally extend between and operatively connect the inner frame members 138 and 166 together.

Figure 26:
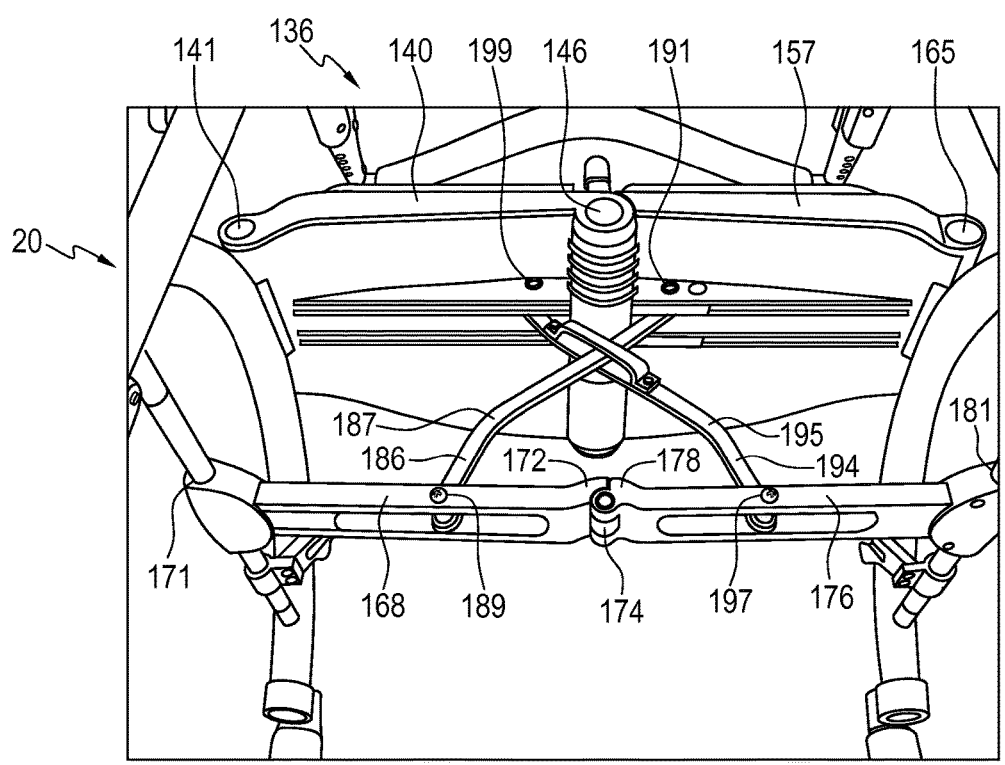
FIG. 26 is a rear, bottom perspective view of the folding mechanism in the extended mode together with the walker apparatus.
Figure 27:
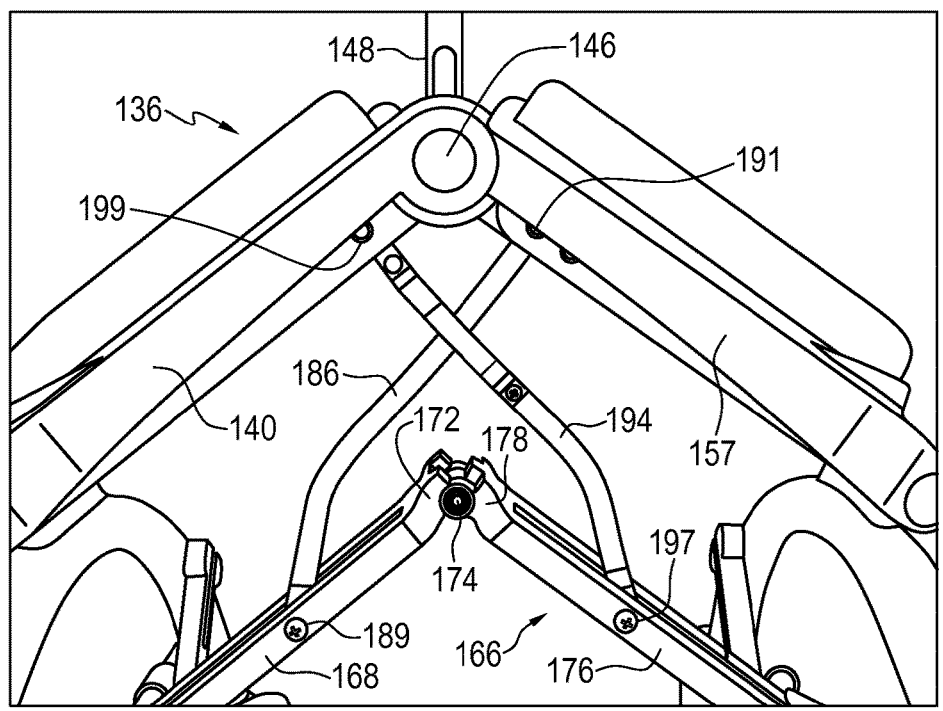
FIG. 27 is a rear elevation view of the folding mechanism of FIG. 26 in a partially folded mode.
Figure 28:
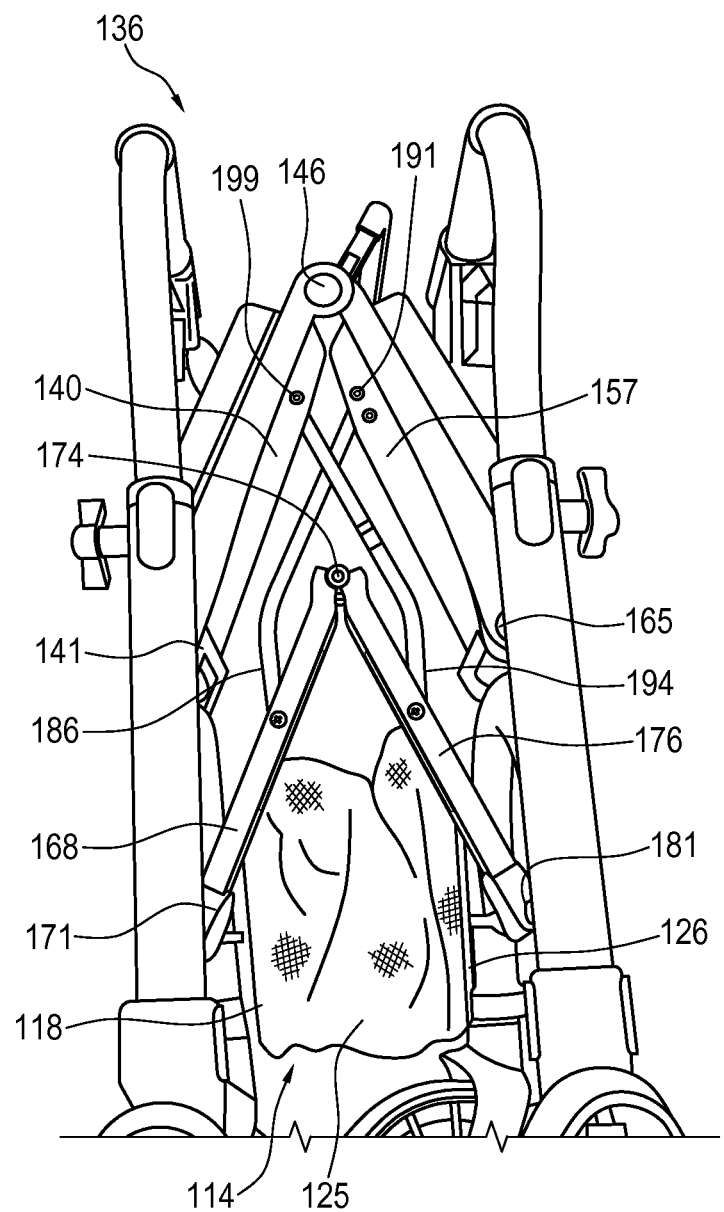
FIG. 28 is a rear elevation view of the folding mechanism and walker apparatus in a fully folded mode.
Figure 29:
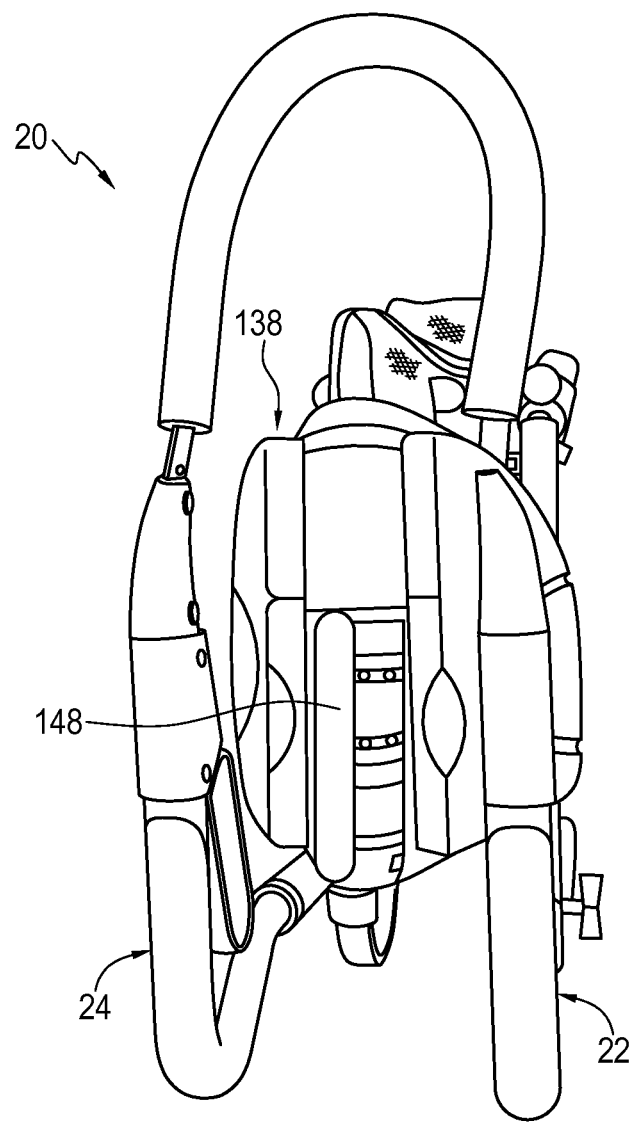
FIG. 29 a top plan view of the walker apparatus illustrated in FIG. 28 in the fully folded mode.
Figure 30:
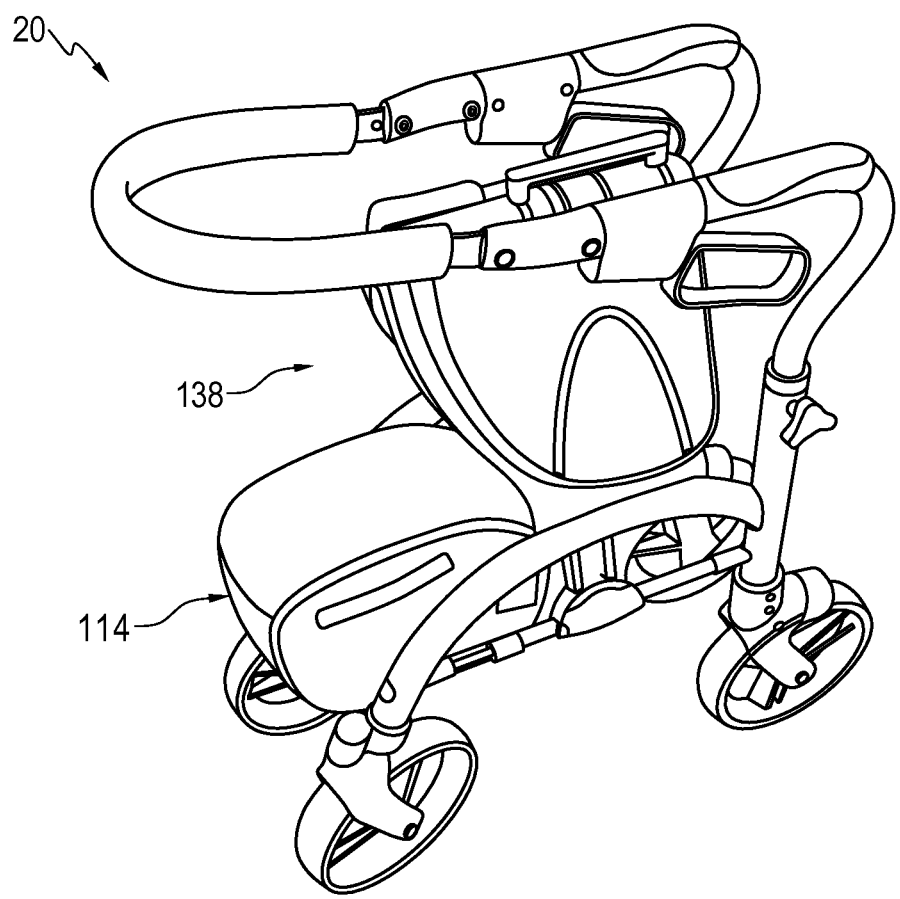
FIG. 30 a top, front isometric view of the walker apparatus in the fully mode.

The operation of the folding mechanism 136 is illustrated in FIGS. 26 to 30. FIG. 26 shows the folding mechanism 136 on the walker apparatus 20 in the unfolded or fully open mode in which inner frame members 136 and 166 are substantially horizontal. FIG. 27 shows the folding mechanism 136 in a partially folded mode. The user pulls the seat handle 148 upwards from the perspective of the FIG. 27. This causes the first part 140 and the second part 157 of the inner frame member 136 to fold through pivot 146 together and towards each other. Because the link members 185 and 194 are connected close to the seat handle 148, the actuation of the seat handle 148 also causes the first link member 186 and the second link member 194 to pull the first part 168 and the second part 176 of the inner frame member 166 to fold together and towards each other by means of pivot 174. The inner frame members continue to fold together until a fully folded mode is reached as shown in FIGS. 28 to 30. The foldable walker 20 is thereby laterally folded together in a compact, upright manner, with the outer frames 22 and 24 coming together. Advantageously, the foldable walker 20 may remain standing in the fully folded mode and be moved like a piece of luggage on wheels.

The structure of the present invention provides many advantages. For the brake pad assembly, because both the brake pad mechanism 200 and means 214 for connecting and adjusting are within the brake housing 277, the life of these components is prolonged by the housing, inhibiting the entry of dirt and rocks therein. Also, the brake housing 277 provides a compact, streamline solution for covering the mechanism 200 and means 214 so as to protect the interior against general wear and tear, to inhibit damage from the user's feet, and to inhibit entanglement with the user's clothes, which ensures that the walker apparatus is safer. Conveniently, when the brake pad needs adjusting, the covering portion 261 is readily removable for accessing the means 214.

The brake rod of the present invention provides the advantage of being self-adjusting and without requiring user intervention or being accessible to the user. The gripping member 108 may slide along the brake rod until such time as braking is needed. The gripping member 99 continues to be engageable to operate for braking even if the thumb screw is loose, unscrewed, strip-threaded or otherwise damaged. This provides an added layer of safety for the user as it inhibits the user from tampering with or adjusting the brake rod assembly. It is provides the advantage of ensuring that braking still works when the user needs to brake but, for example, where the walker apparatus has been damaged through an accident, or where the user does not have the sufficient dexterity to make other adjustments.

The frame shape of the walker apparatus, and in particular the support members 100 and 102 with their arc-shape provide the advantage of allowing a light, aircraft-quality aluminum to be used but still maintaining high strength and support requirements. In one example, the structure with the seat 139 resting on the apexes of the support members provides a rated weight capacity of at least 300 lbs. Because the frame locates the seat 139 in the middle of the walker apparatus, that is, halfway between the wheels, the frame thereby provides a walker apparatus that is more stable and therefore safer.

The collapsible basket 114 has the advantage of requiring very few parts: simply two connectable end members each having a rigid peripheral portion with fabric stretching around therebetween. The basket 114 is more user-friendly in that it can remain connected to and need not be removed the walker apparatus when the walker is folded. The basket 114 connects and folds in such a manner as to not comprise the integrity of the support members 100 and 102 or other aspects of the walker frame. Because the sides 131 and 133 are made of netting as opposed to continuous fabric, this allows the basket 114 to fold even more easily.

The folding mechanism provides a structure that better promotes later support and is therefore more robust. The bends 187 and 195 offer more resistance to shear forces acting, for example, against the support members. Because the links 186 and 194 intersect, they inhibit torsional twisting of the frame of the walker apparatus. The inner frame members 136 and 166 further promote lateral support. This means that the folding mechanism only requires two cross links 186 and 194 for its functioning and therefore uses fewer parts. This results in the advantage of providing a folding mechanism that is easier to manufacture and thus less expensive. The bends 187 and 195 also enable the folding mechanism to fold laterally in a more compact manner.

Because the links 186 and 194 are spaced inwardly from the support members 100 and 102, this provides the walker apparatus with a folding mechanism that is more compact and less likely to tangle with the user's clothing. Also, it results in a folding mechanism that is more durable if the walker is dropped or otherwise damaged because the links 186 and 194 are adjacent to the support members 100 and 102 and seat 139.

Those skilled in the art will appreciate that many variations are possible within the scope of the inventive aspects of the walker apparatus. For example, instead of the folding mechanism 136, other means may be used for bringing together the frame members for folding the walker, as are known to those skilled in the art, for the non-folding inventive aspects of the walker apparatus.

For aspects of the invention other than the brake rod, those skilled in the art will appreciate that, instead of a brake rod, other means for actuating a brake pad mechanism may be used for the walker apparatus.

The handle bar assembly disclosed in the present invention is just by way of example. Those skilled in the art will appreciate that other means for engaging a brake pad mechanism may be used for the walker apparatus.

Those skilled in the art will appreciate that, instead of the brake pad mechanism 211, other brake pad means for braking at least one of the wheels may be used for the walker apparatus for its non-brake pad and non-brake housing inventive aspects. Likewise, other means 214 for connecting and adjusting the corresponding brake pad may be used for the walker apparatus for its non-brake pad and non-brake housing inventive aspects.

It will further be understood by a person skilled in the art that many of the details provided above are by way of example only and can be varied or deleted without departing from the scope of the invention as set out in the following claims.

What is claimed is:

1. A folding mechanism for a walker apparatus, the folding mechanism comprising:
    a pair of spaced-apart inner frame members, each of the inner frame members including a first part and a second part hingedly connected together; and
    a pair of link members diagonally extending between and pivotally connecting to the inner frame members, the link members operatively connecting the inner frame members together.

2. The mechanism as claimed in claim 1, wherein the inner frame members are substantially horizontal when the mechanism is in an unfolded mode.

3. The mechanism as claimed in claim 1, further including a handle outwardly extending from one of the inner frame members.

4. The mechanism as claimed in claim 3, whereby actuation of the handle causes the link members to pull the first part and the second part of a first one of the inner frame members to fold together and towards each other.

5. A walker apparatus having the folding mechanism of claim 1, the apparatus further including a pair of spaced-apart support members between which the inner frame members extend.

6. The apparatus as claimed in claim 5 wherein the support members are arc-shaped.

7. A walker apparatus having the folding mechanism of claim 1, the apparatus further including a pair of spaced-apart support members, a first one of the inner frame members extending between and pivotally connecting to the support members.

8. The apparatus as claimed in claim 7 wherein the link members are spaced-apart inwardly from the support members.

9. A walker apparatus comprising:
    a pair of spaced-apart, foldable inner frame members; and
    a pair of diagonally-extending link members, the link members connecting the inner frame members together.

10. The apparatus as claimed in claim 9, wherein each of the inner frame members includes a first part and a second part hingedly connected together.

11. The apparatus as claimed in claim 9, further including a pair of spaced-apart, upright outer frame members, the inner frame members extending between the outer frame members.

12. The apparatus as claimed in claim 11, wherein the inner frame members are pivotable relative to the outer frame members.

13. The apparatus as claimed in claim 9 wherein each of the link members has an outwardly-extending bend.

14. The apparatus as claimed in claim 11 wherein the link members have an extended mode for opening the inner frame members outward and thereby spacing-apart the outer frame members, and a folded mode for bringing the inner frame members together.

15. The apparatus as claimed in claim 9 further including a bracket outwardly extending from a first one of the link members to enable a second one of the link members to slidably pass therethrough.

16. The apparatus as claimed in claim 9, wherein the inner frame members are shaped to provide lateral support to the apparatus.

17. The apparatus as claimed in claim 9, wherein a first one of the inner frame members has teeth positioned to inter-engage in an extended mode.

18. The apparatus as claimed in claim 9, further including a pair of spaced-apart upright, outer frame members, a pair of support members extending from respective ones of the outer frame members, and a pair of rods extending from respective ones of the outer frame members, a first one of the inner frame members pivotally connecting to the support members and a second one of the inner frame members pivotally connecting to the rods.

19. The apparatus as claimed in claim 18, wherein the support members are arc-shaped and wherein the rods extend between respective ends of the support members.

20. The apparatus as claimed in claim 18 wherein the first one of the inner frame members extends between the support members and wherein the second one of the inner frame members extends between the rods.

* * * * *